US012738236B1

(12) United States Patent
Feng et al.

(10) Patent No.: US 12,738,236 B1
(45) Date of Patent: Sep. 15, 2026

(54) DISPLAY PANEL AND DISPLAY DEVICE

(71) Applicant: Xiamen Tianma Display Technology Co., Ltd., Xiamen (CN)

(72) Inventors: Xuehuan Feng, Xiamen (CN); Yana Gao, Xiamen (CN); Xingyao Zhou, Xiamen (CN); Zhiqiang Xia, Xiamen (CN); Kang Yang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 19/260,011

(22) Filed: Jul. 3, 2025

(30) Foreign Application Priority Data

Apr. 11, 2025 (CN) ......................... 202510457365.5

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2300/0861* (2013.01); *G09G 2310/0286* (2013.01); *G09G 2310/06* (2013.01); *G09G 2310/08* (2013.01); *G09G 2320/0233* (2013.01); *G09G 2320/0257* (2013.01); *G09G 2330/08* (2013.01)

(58) Field of Classification Search
CPC ............... G09G 3/3266; G09G 3/3233; G09G 2300/0819; G09G 2300/0852; G09G 2300/0861; G09G 2310/0286; G09G 2310/06; G09G 2310/08; G09G 2320/0233; G09G 2320/0257; G09G 2330/08
See application file for complete search history.

(56) References Cited

U.S. PATENT DOCUMENTS

2021/0142725 A1* 5/2021 Yu ........................ G09G 3/3233
2021/0366379 A1* 11/2021 Xu ..................... H10K 59/1216
2022/0059001 A1* 2/2022 Yuan ........................ G09G 3/20

FOREIGN PATENT DOCUMENTS

CN 120071810 A 5/2025

* cited by examiner

*Primary Examiner* — Brent D Castiaux
(74) *Attorney, Agent, or Firm* — Anova Law Group, PLLC

(57) ABSTRACT

A display panel and a display device are provided. The display panel includes shift register. The shift register includes shift register units. The shift register unit includes input circuit, output circuit and voltage stabilization circuit. The shift register unit also includes input terminal, first clock terminal, first auxiliary voltage terminal, first voltage terminal, second voltage terminal, third voltage terminal and output terminal. The input circuit is configured to control a signal of the first node and a signal of the second node. The voltage stabilization circuit is configured to control a transmission path between the first node and the third node. The output circuit is configured to control the output terminal to output a first output signal. During at least a part of a period when the signal of the third node is at an enable level, the first node and the third node are cut off from each other.

20 Claims, 10 Drawing Sheets

DISPLAY PANEL AND DISPLAY DEVICE

CROSS-REFERENCE TO RELATED APPLICATION

The present disclosure claims priority of Chinese Patent Application No. 202510457365.5, filed on Apr. 11, 2025, the entire content of which is hereby incorporated by reference.

FIELD OF THE DISCLOSURE

The present disclosure generally relates to the field of display technology and, more particularly, relates to a display panel and a display device.

BACKGROUND

An organic electroluminescent display (OLED) device, as an active light-emitting display device, has gradually become a mainstream in the display field due to its low power consumption, high color saturation, wide viewing angle and other characteristics. To achieve display function of an OLED device, a driving signal may need to be input into the display area of the OLED device to display an image.

The driving signal may be output through a shift drive circuit. Different shift register units in a shift drive circuit may be connected to pixel circuits located in different rows respectively, to control pixels in different rows to be driven in sequence. A stable driving signal may contribute to a stable display of the OLED device, and a stable driving signal may also contribute to an accurate display of the OLED device.

As such, how to control a shift drive circuit to stably output a driving signal to meet requirements for accurate and stable display is a technical problem that needs to be solved urgently by those skilled in the art.

SUMMARY

One aspect of the present disclosure includes a display panel. The display panel includes a shift register. The shift register includes a plurality of shift register units. A shift register unit of the plurality of shift register units includes an input circuit, an output circuit and a voltage stabilization circuit. The shift register unit also includes an input terminal, a first clock terminal, a first auxiliary voltage terminal, a first voltage terminal, a second voltage terminal, a third voltage terminal and an output terminal. The input circuit is electrically connected to the input terminal, the first clock terminal, a first node and a second node respectively, and the input circuit is configured to control a signal of the first node and a signal of the second node according to an input signal of the input terminal and a first clock signal of the first clock terminal. The voltage stabilization circuit is electrically connected to the first auxiliary voltage terminal, the first voltage terminal, the first node and a third node respectively, and the voltage stabilization circuit is configured to control a transmission path between the first node and the third node according to a signal of the first auxiliary voltage terminal, a signal of the first voltage terminal and a signal of the third node. The output circuit is electrically connected to the second voltage terminal, the third voltage terminal, the third node, the second node, and the output terminal respectively, and the output circuit is configured to control the output terminal to output a first output signal according to the signal of the third node and the signal of the second node. During at least a part of a period when the signal of the third node is at an enable level, the first node and the third node are cut off from each other.

Another aspect of the present disclosure includes a display device. The display device includes a display panel. The display panel includes a shift register. The shift register includes a plurality of shift register units. A shift register unit of the plurality of shift register units includes an input circuit, an output circuit and a voltage stabilization circuit. The shift register unit also includes an input terminal, a first clock terminal, a first auxiliary voltage terminal, a first voltage terminal, a second voltage terminal, a third voltage terminal and an output terminal. The input circuit is electrically connected to the input terminal, the first clock terminal, a first node and a second node respectively, and the input circuit is configured to control a signal of the first node and a signal of the second node according to an input signal of the input terminal and a first clock signal of the first clock terminal. The voltage stabilization circuit is electrically connected to the first auxiliary voltage terminal, the first voltage terminal, the first node and a third node respectively, and the voltage stabilization circuit is configured to control a transmission path between the first node and the third node according to a signal of the first auxiliary voltage terminal, a signal of the first voltage terminal and a signal of the third node. The output circuit is electrically connected to the second voltage terminal, the third voltage terminal, the third node, the second node, and the output terminal respectively, and the output circuit is configured to control the output terminal to output a first output signal according to the signal of the third node and the signal of the second node. During at least a part of a period when the signal of the third node is at an enable level, the first node and the third node are cut off from each other.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
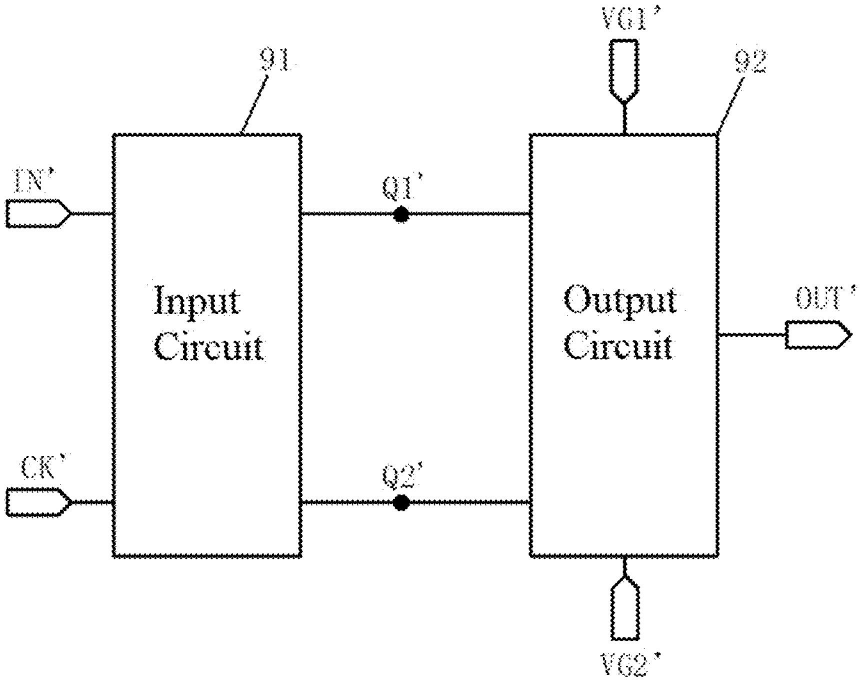
FIG. 1 illustrates a schematic circuit structural diagram of a shift register unit in existing technology.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the present disclosure.

It should be noted that in the present disclosure, relational terms such as “first” and “second” are only used to distinguish one entity or operation from another entity or operation, and do not necessarily require or imply that such actual relationship or sequence exists between these entities or operations. Terms “comprise”, “include” or any other variations thereof are intended to cover a non-exclusive inclusion. A process, method, article, or apparatus that includes a series of elements includes not only the series of elements, but also other elements not expressly listed, or elements inherent to such a process, method, article, or apparatus. Without further limitation, an element defined by a statement like “comprises a . . . ” does not exclude the presence of additional identical elements in a process, method, article, or apparatus that includes the foregoing element. In the present disclosure, that layer A and layer B are “disposed on a same layer” means that layer A and layer B are made of a same material and in a same process.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

FIG. 1 illustrates a schematic circuit structural diagram of a shift register unit in existing technology. Referring to FIG. 1, the shift register unit includes an input circuit 91 and an output circuit 92. The input circuit 91 is electrically connected to an input terminal IN', a clock terminal CK', a first node Q1' and a second node Q2' respectively. The input circuit 91 may control the signals of the first node Q1' and the second node Q2' according to the input signal input by the input terminal IN' and the clock signal of the clock terminal CK'. The output circuit 92 is electrically connected to the first node Q1', the second node Q2', a first voltage terminal VG1', a second voltage terminal VG2' and an output terminal OUT' respectively. The output circuit 92 may transmit the signal of the first voltage terminal VG1' to the output terminal OUT' when the first node Q1' is at an enable level. The output circuit 92 may also transmit the signal of the second voltage terminal VG2' to the output terminal OUT' when the second node Q2' is at an enable level. The signal of the second voltage terminal VG2' is a non-enable signal of the output terminal OUT', and the level of the second voltage terminal VG2' is a non-enable level of the output terminal OUT'.

Figure 2:
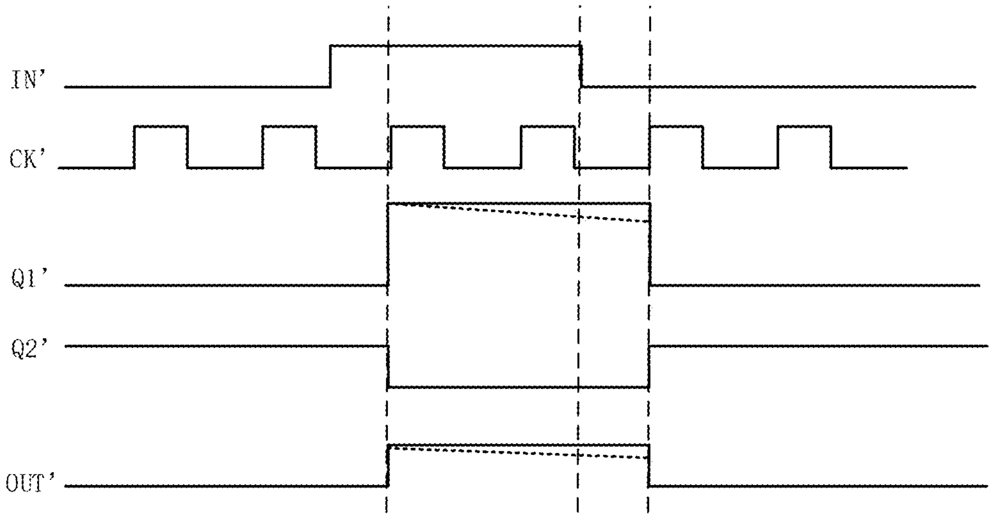
FIG. 2 illustrates a timing diagram of the shift register unit shown in FIG. 1.

FIG. 2 illustrates a timing diagram of the shift register unit shown in FIG. 1.

In one embodiment, the enable levels each are high levels and the non-enable levels each are low levels. FIG. 2 shows level changes at each node position. Referring to FIG. 2, during the period when the first node Q1' is at a high level, the output circuit 92 may transmit a high-level signal of the first voltage terminal VG1' to the output terminal OUT', and the output terminal OUT' may output a high-level signal. During the period when the second node Q2' is at a high level, the output circuit 92 may transmit the low-level signal of the second voltage terminal VG2' to the output terminal OUT', and the output terminal OUT' may output a low-level signal.

Process errors may affect the threshold voltage of the transistors in the shift register unit. When the absolute value of the threshold voltage is small, a leakage path may be formed. During the period when the first node Q1' is at an enable level, the first node Q1' may leak electricity to the input circuit 91, causing the first node Q1' to change from an enable level to an non-enable level (dashed line in FIG. 2). The level change of the first node Q1' may affect the ability of the output circuit 92 to transmit the signal of the first voltage terminal VG1' to the output terminal OUT', and thus affect the output capability of the enable level. As such, the drive signal output by the shift register unit may be distorted, and the operation of the pixel circuit may be affected. As a result, at least a part of the display area may not display stably and accurately, resulting in poor display effect.

To solve the above technical problems, the present disclosure provides a display panel. The display panel includes a shift register. The shift register includes a plurality of shift register units. The shift register unit includes an input circuit, an output circuit and a voltage stabilization circuit. The shift register unit also includes an input terminal, a first clock terminal, a first auxiliary voltage terminal, a first voltage terminal, a second voltage terminal, a third voltage terminal and an output terminal. The input circuit is electrically connected to the input terminal, the first clock terminal, the first node and the second node respectively. The input circuit is configured to control the signals of the first node and the second node according to the input signal of the input terminal and the first clock signal of the first clock terminal. The voltage stabilization circuit is electrically connected to the first auxiliary voltage terminal, the first voltage terminal, the first node and the third node respectively. The voltage stabilization circuit is configured to control the transmission path between the first node and the third node according to the signal of the first auxiliary voltage terminal, the signal of the first voltage terminal and the signal of the third node. The output circuit is electrically connected to the second voltage terminal, the third voltage terminal, the third node, the second node, and the output terminal respectively. The output circuit is configured to control the output terminal to output the first output signal according to the signal of the third node and the signal of the second node. During at least a part of the period when the signal of the third node is at the enable level, the first node and the third node are cut off from each other.

The display panel may include a shift register including a plurality of shift register units. The shift register may output a first output signal that shifts sequentially. The output circuit of each shift register unit may sequentially output a valid pulse of the first output signal when the third node in the shift register unit is at the enable level. As such, an orderly operation of the pixel circuit may be achieved, such that the display panel may display an image. In addition, a voltage stabilization circuit may be disposed between the first node and the third node of the shift register unit. When the third node is at an enable level, the voltage stabilization circuit may interrupt the transmission path between the first node and the third node during at least a part of the period, and cut off the first node and the third node. As such, the third node may be maintained at the enable level, and the third node may provide a stable enable level to the output circuit. Accordingly, the output circuit of the shift register unit may provide a stable enable level to the pixel circuit, the stable operation of the pixel circuit may be realized, and the display effect and reliability of the display panel may be improved. As a result, leakage from the third node to the first node and the input circuit may be avoided, and thus the enable level of the third node and the enable level of the output circuit may not be affected. As such, abnormal transistor state in the pixel circuit may be avoided, and the node level in the pixel circuit may not be affected. Accordingly, the light-emitting element in the pixel circuit may display accurately, and the display effect may be improved.

The core idea of the present disclosure is described above. Technical solutions of the present disclosure will be described below in conjunction with embodiments and accompanying drawings.

Figure 3:
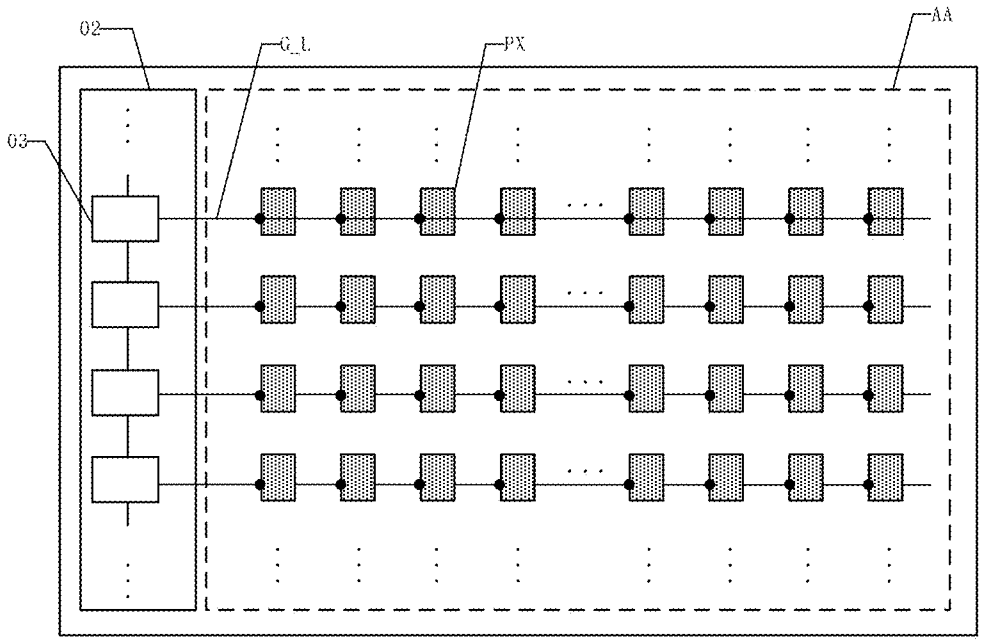
FIG. 3 illustrates a schematic top-view structural diagram of a display panel consistent with the disclosed embodiments of the present disclosure.

FIG. 3 illustrates a schematic top-view structural diagram of a display panel consistent with the disclosed embodiments of the present disclosure. Referring to FIG. 3, the display panel 01 includes a plurality of pixel circuits PX arranged in an array. The pixel circuits PX are arranged into pixel circuit rows in a horizontal direction. A plurality of cascaded shift register units 03 form a shift register 02. An output end of the shift register unit 03 is connected to each pixel circuit PX in a pixel circuit row through a scan line G_L. The pixel circuit PX includes a light-emitting element and one or more transistors. The shift register unit 03 may output an enable level to drive the pixel circuit PX.

It should be noted that FIG. 3 only shows a configuration where the shift register 02 is located on one side of the display area AA. In some other embodiments, the shift register 02 may be located on two sides or three sides of the display area AA, or the shift register 02 may be located in the display area AA. The present disclosure does not limit a specific location of the shift register 02.

Figure 4:
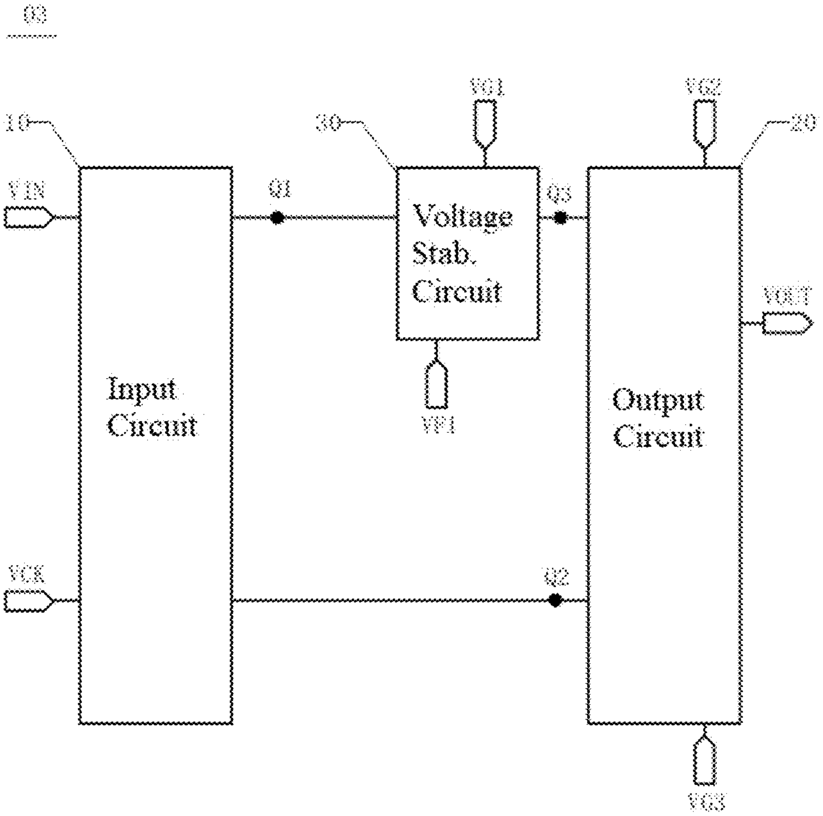
FIG. 4 illustrates a schematic circuit structural diagram of a shift register unit consistent with the disclosed embodiments of the present disclosure.

FIG. 4 illustrates a schematic circuit structural diagram of a shift register unit consistent with the disclosed embodiments of the present disclosure. Referring to FIG. 4, the shift register unit 03 includes an input circuit 10, an output circuit 20 and a voltage stabilization circuit 30. The shift register unit 03 also includes an input terminal VIN, a first clock terminal VCK, a first auxiliary voltage terminal VF1, a first voltage terminal VG1, a second voltage terminal VG2, a third voltage terminal VG3, and an output terminal VOUT.

The input circuit 10 is electrically connected to the input terminal VIN, the first clock terminal VCK, the first node Q1 and the second node Q2 respectively. The input circuit 10 is configured to control signals of the first node Q1 and the second node Q2 according to an input signal of the input terminal VIN and a first clock signal ck1 of the first clock terminal VCK.

The voltage stabilization circuit 30 is electrically connected to the first auxiliary voltage terminal VF1, the first voltage terminal VG1, the first node Q1 and the third node Q3 respectively. The voltage stabilization circuit 30 is configured to control a transmission path between the first node Q1 and the third node Q3 according to a signal of the first auxiliary voltage terminal VF1, a signal of the first voltage terminal VG1, and a signal of the third node Q3.

The output circuit 20 is electrically connected to the second voltage terminal VG2, the third voltage terminal VG3, the third node Q3, the second node Q2 and the output terminal VOUT respectively. The output circuit 20 is configured to control the output terminal VOUT to output a first output signal according to the signal of the third node Q3 and the signal of the second node Q2. In an optional embodiment, the output terminal VOUT of the output circuit 20 may be electrically connected to one or more pixel circuits PX to provide the first output signal to the one or more pixel circuits PX.

The signal of the third node Q3 may be used to control the output circuit 20. When the signal of the third node Q3 is at an enable level, at least a part of the transistors in the output circuit 20 may be controlled to be turned on, such that the output circuit 20 may transmit the signal of the second voltage terminal VG2 to the output terminal VOUT. When the signal of the third node Q3 is at a non-enable level, at least a part of the transistors in the output circuit 20 may be controlled to be turned off, such that the output circuit 20 may no longer transmit the signal of the second voltage terminal VG2 to the output terminal VOUT. The signal of the second node Q2 may also be used to control the output circuit 20. When the signal of the second node Q2 is at an enable level, at least a part of the transistors in the output circuit 20 may be controlled to be turned on, such that the output circuit 20 may transmit the signal of the third voltage terminal VG3 to the output terminal VOUT. When the signal of the second node Q2 is at a non-enable level, at least a part of the transistors in the output circuit 20 may be controlled to be turned off, such that the output circuit 20 may no longer transmit the signal of the third voltage terminal VG3 to the output terminal VOUT. In an optional embodiment, the signal of the third node Q3 and the signal of the second node Q2 are not at an enable level simultaneously.

During at least a part of the period when the signal of the third node Q3 is at an enable level, the first node Q1 and the third node Q3 are cut off. As such, during at least a part of the period when the output circuit 20 transmits the signal of the second voltage terminal VG2 to the output terminal VOUT, the first node Q1 and the third node Q3 may be cut off. Accordingly, the enable level of the third node Q3 may be maintained, formation of a leakage path between the third node Q3 and the input circuit 10 may be avoided, and the output capability of the output circuit 20 may be maintained.

As such, the output circuit 20 may control the output terminal VOUT to stably output an enable level of the first output signal. Furthermore, when the pixel circuit PX in the display panel 01 receives the stable enable level, the light-emitting elements may be controlled to stably and accurately display light, and the display effect may be improved. In an optional embodiment, the first output signal may be used to control the pixel circuit PX. When the first output signal is at an enable level, at least a part of the transistors in the pixel circuit PX may be controlled to be turned on. When the first output signal is at a non-enable level, at least a part of transistors in the pixel circuit PX may be controlled to be turned off.

It may be understood that when at least a part of the transistors in the voltage stabilization circuit 30 are turned on, the signal of the first node Q1 may be transmitted to the third node Q3. During this period, no matter the first node Q1 is at an enable level or a non-enable level, the signal of the first node Q1 may be transmitted to the third node Q3. Only during at least a part of the period when the signal of the third node Q3 is at an enable level, the signal Q3 of the third node may not be transmitted to the first node Q1. As such, the enable level of the first node Q1 and the enable level of the third node Q3 may have same polarity. For example, the enable level of the first node Q1 and the enable level of the third node Q3 each may be greater than zero, or each may be less than zero. In other words, the enable level of the first node Q1 may also control at least a part of the transistors in the output circuit 20 to be turned on, such that the output circuit 20 may transmit the signal of the second voltage terminal VG2 to the output terminal VOUT. The non-enable level of the first node Q1 may also control at least a part of the transistors in the output circuit 20 to be turned off, such that the output circuit 20 may stop transmitting the signal of the second voltage terminal VG2 to the output terminal VOUT.

Specifically, in at least a part of the period when the signal of the first node Q1 is at an enable level, the signal of the first node Q1, the signal of the first auxiliary voltage terminal VF1 and/or the signal of the first voltage terminal VG1 may operate together to control the voltage stabilization circuit 30 to conduct the transmission path between the first node Q1 and the third node Q3. As such, the enable level of the first node Q1 may be transmitted to the third node Q3. During at least a part of the period when the signal of the third node Q3 is at an enable level, the signal of the third node Q3, the signal of the first auxiliary voltage terminal VF1 and/or the signal of the first voltage terminal VG1 may control the voltage stabilization circuit 30 to interrupt the transmission path between the first node Q1 and the third node Q3. As such, the first node Q1 and the third node Q3 may be cut off to reduce leakage current of the third node Q3. Accordingly, the signal of the third node Q3 may be stably maintained at the enable level, thereby controlling the output circuit 20 to stably transmit the signal of the second voltage terminal VG2 to the output terminal VOUT. In an optional embodiment, the signal of the first auxiliary voltage terminal VF1 may be a constant voltage signal or a non-constant voltage signal such as a clock signal; and the signal of the first voltage terminal VG1 may also be a constant voltage signal or a non-constant voltage signal such as a clock signal.

During at least a part of the period when the signal of the third node Q3 is at an enable level, the signal of the first voltage terminal VG1 may be at an enable level, such that the output circuit 20 may control the output terminal VOUT to stably output the enable level of the first output signal. During the period when the signal of the second node Q2 is at the enable level, the signal of the third voltage terminal VG3 may be at a non-enable level, such that the output circuit 20 may control the output terminal VOUT to stably output the non-enable level of the first output signal. In an optional embodiment, the signal of the second voltage terminal VG2 may be a constant voltage signal or a non-constant voltage signal such as a clock signal, and the signal of the third voltage terminal VG3 may be a constant voltage signal.

Exemplarily, still referring to FIG. 4, the input circuit 10 may transmit the input signal of the input terminal VIN to the first node Q1 under the control of the enable level of the first clock signal ck1 of the first clock terminal VCK, such that the level of the first node Q1 may match the input signal of the input terminal VIN. When the input signal of the input terminal VIN and the first clock signal ck1 of the first clock terminal VCK are each at an enable level, the signal of the first node Q1 may change to an enable level. The voltage stabilization circuit 30 may transmit the enable level of the first node Q1 to the third node Q3, and after the third node Q3 is at the enable level, stop transmitting the enable level of the third node Q3 to the first node Q1. As such, the enable level of the third node Q3 may be prevented from leaking to the first node Q1 and the input circuit 10. Simultaneously, when the first clock signal ck1 of the first clock terminal VCK and the input signal of the input terminal VIN are each at the enable level, the input signal of the input terminal VIN or the first clock signal ck1 of the first clock terminal VCK may be stopped from being transmitted to the second node Q2. The signal of the second node Q2 may not change to the enable level, and the signal of the second node Q2 may remain at the non-enable level. As such, the output circuit 20 may only transmit the signal of the second voltage terminal VG2 to the output terminal VOUT, and may not transmit the signal of the third voltage terminal VG3 to the output terminal VOUT. Accordingly, an orderly operation of the shift register unit 03 may be achieved, and the accuracy and stability of the first output signal output by the shift register unit 03 may be improved.

It may be understood that the first clock signal ck1 of the first clock terminal VCK may be a pulse signal in which a high-level signal and a low-level signal are alternately arranged. Generally, a high-level signal and a low-level signal consecutive therewith form a pulse cycle. The high-level signal may be the enable level of the first clock signal ck1, and the low-level signal may be the non-enable level of the first clock signal ck1. In this case, when the first clock signal ck1 is at a high level, at least a part of the transistors in the input circuit 10 may be controlled to be turned on. When the first clock signal ck1 is at a low level, at least a part of the transistors in the input circuit 10 may be controlled to be turned off. Alternatively, the low-level signal may be an enable level of the first clock signal ck1, and the high-level signal may be a non-enable level of the first clock signal ck1. In this case, when the first clock signal ck1 is at a low level, at least a part of the transistors in the input circuit 10 may be controlled to be turned on. The high/low level of the enable level and the non-enable level of the first clock signal ck1 may be set as needed, and is not specifically limited in the present disclosure.

Figure 5:
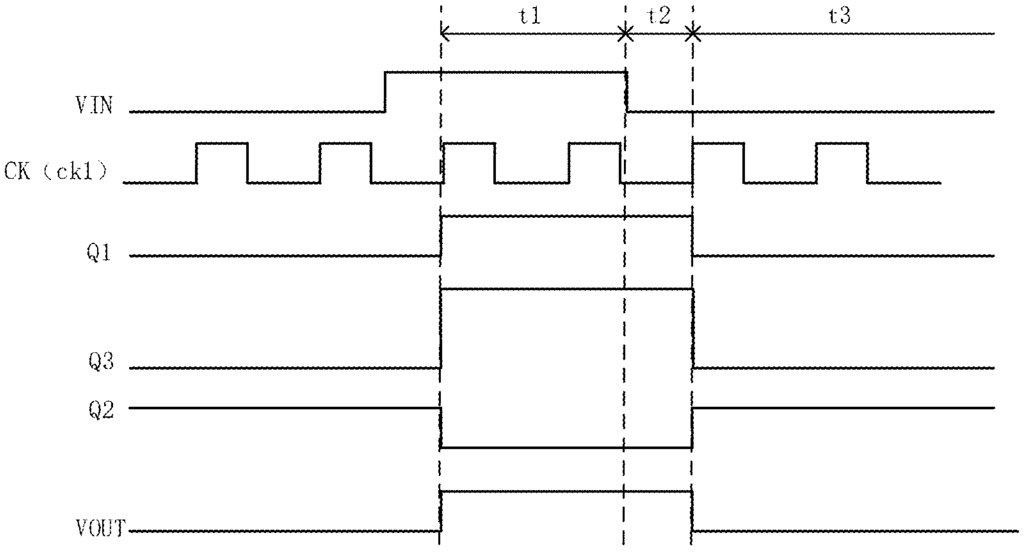
FIG. 5 illustrates a timing diagram of a shift register unit consistent with the disclosed embodiments of the present disclosure.

In one embodiment, the enable levels related to the shift register unit 03 each are high levels, and the non-enable levels each are low levels. FIG. 5 illustrates a timing diagram of a shift register unit consistent with the disclosed embodiments of the present disclosure, and the timing diagram may be used to drive the shift register unit 03 shown in FIG. 4. Referring to FIG. 5, the operation of the shift register unit 03 includes a first period t1 and a second period t2. At least in the first period t1 and the second period t2, the signal of the first node Q1 and the signal of the third node Q3 each are high-level signals. In one embodiment, the voltage stabilization circuit 30 may interrupt the transmission path between the first node Q1 and the third node Q3 in the first time period t1 and the second time period t2. As such, the high level of the third node Q3 may be prevented from leaking to the first node Q1 and the input circuit 10, such that the third node Q3 may be stably maintained at the high level. Accordingly, the shift register unit 03 may stably output the high level signal of the second voltage terminal VG2, the shift register unit 03 may provide a stable high-level enable signal to the pixel circuits PX, and stable operation of the pixel circuits PX may thus be achieved.

It should be noted that the above implementation only exemplarily illustrates a scenario in which the enable levels each are high levels and the non-enable levels each are low levels, but the present disclosure is not limited thereto. The high/low of the enable level and the non-enable level are related to the specific structures of the circuits controlled by the enable/non-enable level signals. For example, when the circuit controlled includes a transistor and the transistor is a P-channel transistor, the enable level may be a low level and the non-enable level may be a high level. When the circuit controlled includes a transistor and the transistor is an N-channel transistor, the enable level may be a high level and the non-enable level may be a low level. In the present disclosure, the high/low of the enable level and the non-enable level may be determined according to actual needs.

It should also be noted that the high level and low level refer to the voltage used to control the circuit to be turned on or off, but are not limited to a fixed voltage. For example, electrical signals in a range of +15V to +30V that may control the circuits to be in a same state may each be high-level signals, and electrical signals in a range of −10V to −5V that may control the circuits to be in a same state may each be low-level signals.

The display panel provided by the present disclosure includes a shift register, and the shift register includes a plurality of shift register units. The shift register may output a first output signal that shifts sequentially. The output circuit of each shift register unit may sequentially output a valid pulse of the first output signal when the third node in the shift register unit is at the enable level. As such, an orderly operation of the pixel circuit may be achieved, such that the display panel may display an image. In addition, a voltage stabilization circuit may be disposed between the first node and the third node of the shift register unit. When the third node is at an enable level, the voltage stabilization circuit may interrupt the transmission path between the first node and the third node during at least a part of the period, and cut off the first node and the third node. As such, the third node may be maintained at the enable level, and the third node may provide a stable enable level to the output circuit. Accordingly, the output circuit of the shift register unit may provide a stable enable level to the pixel circuit, the stable operation of the pixel circuit may be realized, and the display effect and reliability of the display panel may be improved. As a result, leakage from the third node to the first node and the input circuit may be avoided, and thus the enable level of the third node and the enable level of the output circuit may not be affected. As such, abnormal transistor state in the pixel circuit may be avoided, and the node level in the pixel circuit may not be affected. Accordingly, the light-emitting element in the pixel circuit may display accurately, and the display effect may be improved.

Figure 6:
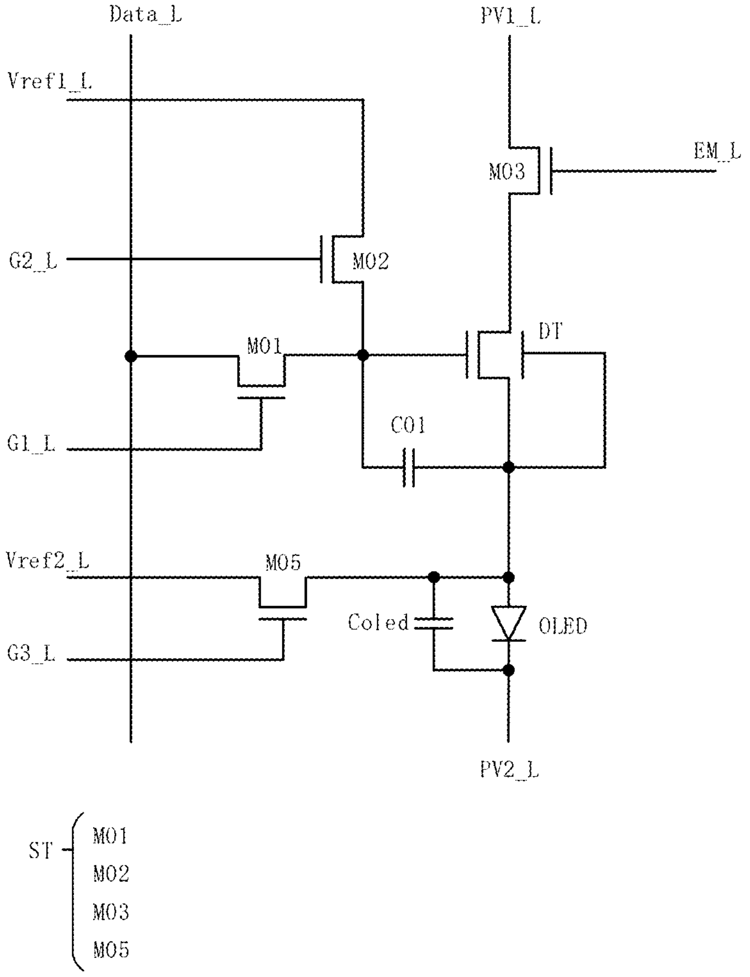
FIG. 6 illustrates a schematic circuit structural diagram of a pixel circuit consistent with the disclosed embodiments of the present disclosure.

FIG. 6 illustrates a schematic circuit structural diagram of a pixel circuit consistent with the disclosed embodiments of the present disclosure. In one embodiment, referring to FIG. 6, the pixel circuit PX includes a driving transistor DT and a switching transistor ST. The driving transistor DT and the switching transistor ST each are N-type transistors. By setting the driving transistor DT as an N-type transistor, carriers in the driving transistor DT are electrons, the driving transistor DT may have higher mobility and lower threshold voltage sensitivity. The hysteresis effect and threshold voltage drift of the driving transistor DT may be reduced, and the afterimage may be reduced. By setting the switch transistor ST as an N-type transistor, the carriers in the switch transistor ST are electrons, and the mobility of electrons may be relatively large. As such, the subthreshold swing of the switch transistor ST may be reduced, leakage current may be reduced, and on-off response may be improved. Accordingly, fast charging and discharging may be achieved, and the refresh rate and resolution may be improved.

In one embodiment, still referring to FIG. 6, the pixel circuit PX includes a driving transistor DT and a switching transistor ST. The switch transistor ST includes a data writing transistor M01, a gate reset transistor M02, a light emission control transistor M03, and an electrode reset transistor M05. The pixel circuit PX also includes a storage capacitor C01. The driving transistor DT may be a dual-gate structure including a top gate and a bottom gate. The top gate is connected to the data writing transistor M01, the gate reset transistor M02 and one plate of the storage capacitor C01. The bottom gate is connected to the other plate of the storage capacitor C01. The gates of the light-emission control transistor M03, the data writing transistor M01, the gate reset transistor M02 and the electrode reset transistor M05 may be electrically connected to the light-emission control line EM_L, the first scan line G1_L, the second scan line G2_L and the third scan line G3_L respectively. The pixel circuit PX may also be connected to the first power line PV1_L, the first reset line Vref1_L, the second reset line Vref2_L, and the data line Data_L. The driving transistor DT of the pixel circuit PX may be connected to the first electrode of the light-emitting element OLED. The second electrode of the light-emitting element OLED may be connected to a second power line PV2_L. In FIG. 6, Coled represents a parasitic capacitance of the light-emitting element OLED.

Figure 7:
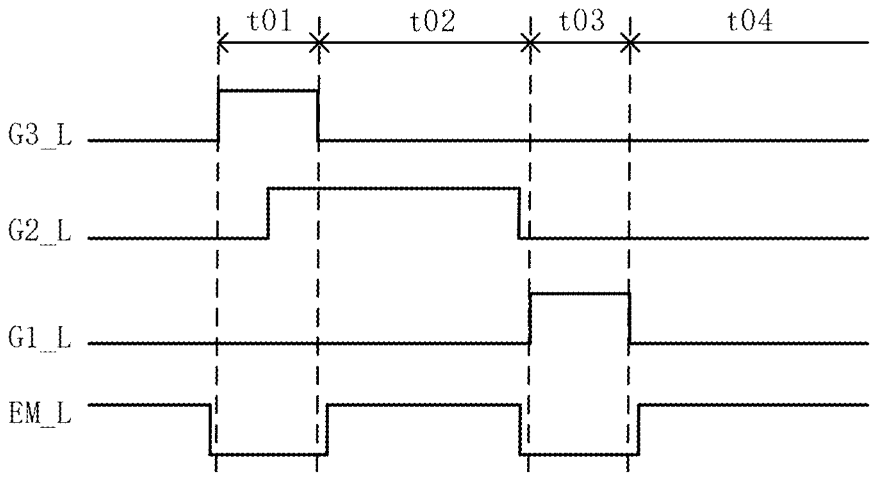
FIG. 7 illustrates a timing diagram of the pixel circuit shown in FIG. 6, consistent with the disclosed embodiments of the present disclosure.

In one embodiment, each transistor in the pixel circuit PX is an N-type transistor. FIG. 7 illustrates a timing diagram of the pixel circuit shown in FIG. 6, consistent with the disclosed embodiments of the present disclosure. Referring to FIGS. 6 and 7, in the reset stage t01, the signal of the second scan line G2_L and the signal of the third scan line G3_L each are at a high level. The gate reset transistor M02 and the electrode reset transistor M05 are turned on. The gate reset transistor M02 may transmit the signal of the first reset line Vref1_L to the gate of the driving transistor DT, such that the driving transistor DT is turned on. The electrode reset transistor M05 may transmit the signal of the second reset line Vref2_L to the first electrode of the light-emitting element OLED.

In the compensation stage t02, the signal of the second scan line G2_L and the signal of the light-emission control line EM_L each are at a high level, and the gate reset transistor M02 and the light-emission control transistor M03 are turned on. The gate reset transistor M02 continues to transmit the signal of the first reset line Vref1_L to the gate of the driving transistor DT, and controls the driving transistor DT to be turned on. The light emission control transistor M03 transmits the signal of the first power line PV1_L to the drain of the driving transistor DT, and transmits the signal of the first power line PV1_L to the source through the driving transistor DT, thereby performing voltage compensation on the source of the driving transistor DT.

In the data writing stage t03, the signal of the first scanning line G1_L is at a high level, and the data writing transistor M01 is turned on. The data writing transistor M01 may transmit the signal of the data line Data_L to the gate of the driving transistor DT.

In the light emitting stage t04, the signal of the light-emission control line EM_L is at a high level, and the light-emission control transistor M03 is turned on. The light emission control transistor M03 may transmit the signal of the first power line PV1_L to the drain of the driving transistor DT, and transmit the signal of the first power line PV1_L to the source of the driving transistor DT through the driving transistor DT. That is, the signal of the first power line PV1_L may be transmitted to the first electrode of the light-emitting element OLED. As such, according to the gate level and the source level of the driving transistor DT, the light-emitting element OLED may emit light for display. The storage capacitor C01 may keep the voltage difference between the gate level and the source level of the driving transistor DT stable.

It should be noted that the above is only an exemplary description of the specific structure and driving principle of the pixel circuit in the display panel provided in the present disclosure. The structure of the pixel circuit and the driving principle thereof in the present disclosure may be designed according to actual needs, and the present disclosure does not limit a specific design.

In an optional embodiment, the shift register may be configured to drive the light-emission control transistor M03 in the pixel circuit PX. The shift register unit 03 may be electrically connected to the light-emission control line EM_L (not shown in FIG. 6). In this case, the signal of the second voltage terminal VG2 may be a constant voltage signal, and the constant voltage signal may be an enable level.

In another optional embodiment, the shift register may be configured to drive the data writing transistor M01 in the pixel circuit PX. The shift register unit 03 may be electrically connected to the first scan line G1_L (not shown in FIG. 6). In this case, the signal of the second voltage terminal VG2 may be a non-constant voltage signal such as a clock signal, and the effective pulse of the second voltage terminal VG2 may be a narrow pulse.

In another optional embodiment, the shift register may be configured to drive the gate reset transistor M02 in the pixel circuit PX. The shift register unit 03 may be electrically connected to the second scan line G2_L (not shown in FIG. 6). In this case, the signal of the second voltage terminal VG2 may be a constant voltage signal or a non-constant voltage signal such as a clock signal. When the signal of the second voltage terminal VG2 is a non-constant voltage signal, the effective pulse at the second voltage terminal VG2 may be a wide pulse.

In another optional embodiment, the shift register may be configured to drive the electrode reset transistor M05 in the pixel circuit PX. The shift register unit 03 may be electrically connected to the third scan line G3_L (not shown in FIG. 6). In this case, the signal of the second voltage terminal VG2 may be a non-constant voltage signal such as a clock signal, and the effective pulse of the second voltage terminal VG2 may be a narrow pulse.

In some other optional embodiments, the shift register may also be configured to simultaneously drive the data writing transistor M01 and the electrode resetting transistor M05 in the pixel circuit PX. The shift register unit 03 may be electrically connected to the first scan line G1_L and the third scan line G3_L connected to a same driving pixel circuit PX or connected to different driving pixel circuits PX (not shown in FIG. 6).

As such, the shift register provided in the present disclosure may be configured to drive any of the switch transistors ST in the pixel circuit PX. In addition, when the transistors in the pixel circuit PX each are N-type transistors, the enable level of the first output signal output by the shift register unit is a high level, and the non-enable level is a low level.

Figure 8:
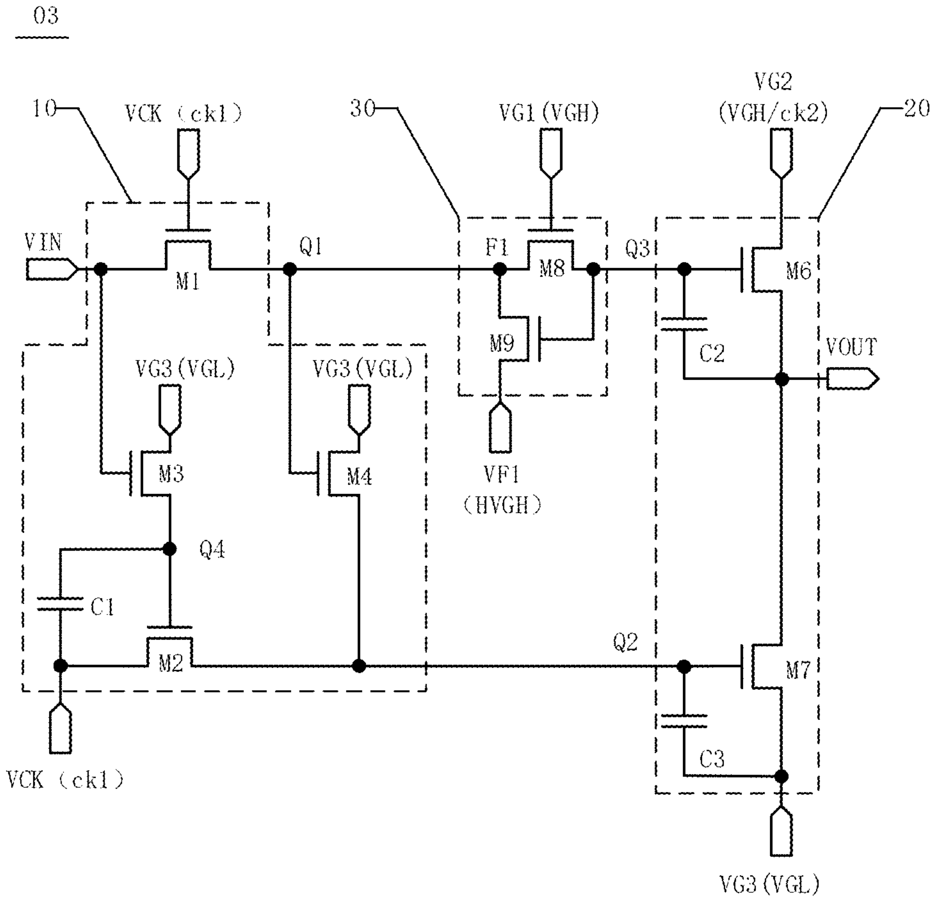
FIG. 8 illustrates a schematic circuit structural diagram of another shift register unit consistent with the disclosed embodiments of the present disclosure.

FIG. 8 illustrates a schematic circuit structural diagram of another shift register unit consistent with the disclosed embodiments of the present disclosure. In one embodiment, referring to FIGS. 6 and 8, the shift register unit 03 may include input transistors (M1, M2, M3, M4), voltage stabilization transistors (M8, M9) and output transistors (M6, M7). The input transistors (M1, M2, M3, M4), the voltage stabilization transistors (M8, M9) and the output transistors (M6, M7) each are N-type transistors. The active layers of the driving transistor DT, the switching transistor ST, the input transistors (M1, M2, M3, M4), the voltage regulating transistors (M8, M9) and the output transistors (M6, M7) each include a metal oxide material. The metal oxide material may include an oxide material of indium (In), gallium (Ga), tin (Sn), zirconium (Zr), hafnium (Hf), titanium (Ti), zinc (Zn), or a combination thereof.

When preparing the active layer of the transistor, there is no need to crystallize to form a crystalline structure. As such, the defect density of the active layer may be small, the carrier mobility of the active layer may be high, and the temperature sensitivity may be low. Accordingly, the voltage stability and switching characteristics of the driving transistor DT may be improved, and the hysteresis effect and threshold voltage drift may be reduced.

In addition, the transistors in the pixel circuit PX and the transistors in the shift register unit 03 each are N-type transistors, and the active layers each include metal oxide materials. The transistors in the pixel circuit PX and the transistors in the shift register unit 03 may be disposed on a same layer, and the manufacturing cost may thus be reduced.

When the transistors in the pixel circuit PX and the transistors in the shift register unit 03 each are N-type transistors, the enable levels related to the pixel circuit PX and the shift register unit 03 each are high levels, and the non-enable levels each are low levels. For ease of description, unless otherwise specified, the present disclosure takes the case where each transistor is an N-type transistor, each enable level is a high level, and each non-enable level is a low level as an example to exemplarily illustrate the technical solutions of the present disclosure.

Optionally, still referring to FIG. 8, the voltage stabilization transistor in the voltage stabilization circuit 30 includes a first voltage stabilization transistor M8 and a first auxiliary transistor M9. A first electrode of the first voltage stabilization transistor M8 is electrically connected to the first node Q1, a second electrode of the first voltage stabilization transistor M8 is electrically connected to the third node Q3, and a gate of the first voltage stabilization transistor M8 is electrically connected to the first voltage terminal VG1. A first electrode of the first auxiliary transistor M9 is electrically connected to the first auxiliary voltage terminal VF1, and a second electrode of the first auxiliary transistor M9 and the first electrode of the first voltage stabilization transistor M8 are electrically connected to the first auxiliary node F1. A gate of the first auxiliary transistor M9 is electrically connected to the third node Q3.

Figure 9:
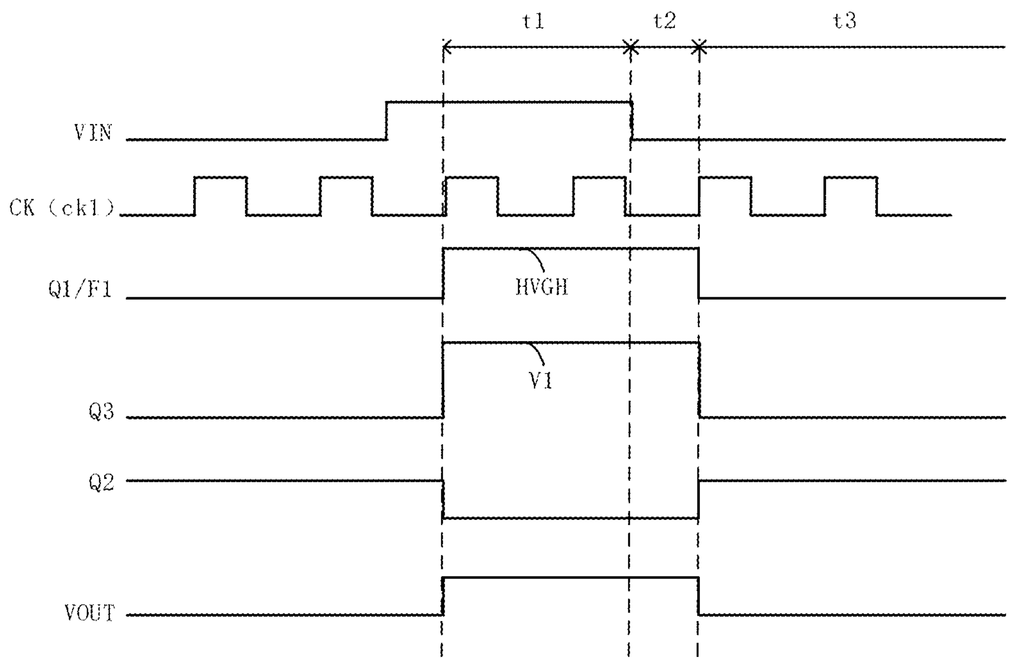
FIG. 9 illustrates a timing diagram of another shift register unit consistent with the disclosed embodiments of the present disclosure.

In one embodiment, the first voltage stabilization transistor M8 and the first auxiliary transistor M9 each are N-type transistors, and the enable levels of the first node Q1 and the third node Q3 each are high levels. FIG. 9 illustrates a timing diagram of another shift register unit consistent with the disclosed embodiments of the present disclosure. The timing diagram may be used to drive the shift register unit 03 shown in FIG. 8. Referring to FIGS. 8 and 9, the first node Q1 may be directly electrically connected to the first auxiliary node F1. When the signal of the first node Q1 is at a high level, the first auxiliary node F1 may also be at a high level. In this stage, the signal of the first voltage terminal VG1 may include a high-level signal. The first voltage terminal VG1 may control the first voltage stabilization transistor M8 to be turned on, and transmit the high-level signals of the first node Q1 and the first auxiliary node F1 to the third node Q3, such that the signal of the third node Q3 may also be at a high level.

The first auxiliary transistor M9 may be turned on when the third node Q3 is at a high level, and transmit the signal of the first auxiliary voltage terminal VF1 to the first auxiliary node F1. In this stage, the gate-source voltage Vgs (M8) of the first voltage stabilization transistor M8 may be controlled to be lower than the threshold voltage Vth (M8) of the first voltage stabilization transistor M8 by using the voltage difference between the first voltage terminal VG1 and the first auxiliary node F1. As such, the first voltage stabilization transistor M8 may be controlled to be turned off, and the cutoff between the first node Q1 and the third node Q3 may be realized. In this way, the leakage current of the high-level signal of the third node Q3 to the first node Q1 and the input circuit 10 may be reduced, and the high-level enable signal of the third node Q3 may be maintained. Accordingly, the shift register unit 03 may provide a stable enable level to the pixel circuit PX, such that the pixel circuit PX may operate stably, and the display effect and reliability of the display panel 01 may be improved.

In an optional embodiment, the signal of the first auxiliary voltage terminal VF1 is a first constant voltage signal. The absolute value of the voltage of the first constant voltage signal is greater than the absolute value of the voltage when the signal of the first voltage terminal VG1 is at an enable level.

In one embodiment, the first voltage stabilization transistor M8 and the first auxiliary transistor M9 each are N-type transistors, and the enable levels of the first node Q1 and the third node Q3 each are high levels. Still referring to FIGS. 8 and 9, the first constant voltage signal of the first auxiliary voltage terminal VF1 may be an enhanced high-level signal HVGH. When the signal of the first voltage terminal VG1 is at an enable level, the signal of the first voltage terminal VG1 may be a normal high-level signal VGH. The voltage of the enhanced high-level signal HVGH may be greater than the voltage of the normal high-level signal VGH. To improve the reliability of transistors, the voltage of the normal high-level signal VGH for controlling the conduction state of the control transistor in the display panel may generally be in a range of approximately 15V to 30V, and the voltage of the enhanced high-level signal HVGH may be in a range of approximately 30V to 40V (or even higher).

When the third node Q3 is at a high level and controls the first auxiliary transistor M9 to be turned on, the signals of the first node Q1 and the first auxiliary node F1 may be the enhanced high-level signal HVGH of the first auxiliary voltage terminal VF1. The voltage of the enhanced high-level signal HVGH may be greater than the voltage of the normal high-level signal VGH, such that the gate-source voltage Vgs (M8) of the first voltage stabilization transistor M8 may be less than zero. Accordingly, the first voltage stabilization transistor M8 may be controlled to be fully turned off, such that the operation state of the voltage stabilization circuit 30 may not be easily affected by a process error. Even when the threshold voltage Vth (M8) of the first voltage stabilization transistor M8 is offset, the first voltage stabilization transistor M8 may be turned off when the third node Q3 is at a high level. Accordingly, the high-level enable signal of the third node Q3 may be maintained, such that the shift register unit 03 may output a stable high-level enable level.

It should be noted that, in FIG. 9, the signals of the first node Q1 and the first auxiliary node F1 may not directly change from low-level signals to enhanced high-level signals HVGH. Instead, under the control of the input circuit 10, the signals of the first node Q1 and the first auxiliary node F1 may first change from low-level signals to normal high-level signals VGH. After the normal high-level signals VGH of the first node Q1 and the first auxiliary node F1 are transmitted to the third node Q3 through the first voltage stabilization transistor M8, the high-level enable signal of the third node Q3 may control the first auxiliary transistor M9 to be turned on, and transmit the enhanced high-level signal HVGH of the first auxiliary voltage terminal VF1 to the first node Q1 and the first auxiliary node F1, such that the signals of the first node Q1 and the first auxiliary node F1 may change from the normal high-level signal VGH to the enhanced high-level signal HVGH. In this process, signals of the first node Q1 and the first auxiliary node F1 may change quickly, and the signal change processes of the first node Q1 and the first auxiliary node F1 are not shown in FIG. 9.

In some other optional embodiments, the first voltage stabilization transistor M8 and the first auxiliary transistor M9 may also be P-type transistors. The enable levels of the first node Q1 and the third node Q3 may also be low levels (not shown in FIGS. 8 and 9). In this case, the voltage of the first constant voltage signal of the first auxiliary voltage terminal VF1 and the voltage of the signal of the first voltage terminal VG1 at the enable level each may be lower than zero. In addition, the voltage of the first constant voltage signal of the first auxiliary voltage terminal VF1 may be smaller than the voltage when the signal of the first voltage terminal VG1 is at the enable level.

Exemplarily, the first constant voltage signal of the first auxiliary voltage terminal VF1 may be an enhanced low-level signal LVGL. When the signal of the first voltage terminal VG1 is at an enable level, the signal of the first voltage terminal VG1 may be a normal low-level signal VGL. The voltage of the enhanced low-level signal LVGL is lower than the voltage of the normal low-level signal VGL. When the third node Q3 is at a low level and the first auxiliary transistor M9 is turned on, the signal of the first auxiliary node F1 may be an enhanced low-level signal LVGL of the first auxiliary voltage terminal VF1, and the voltage of the enhanced low-level signal LVGL is lower than the voltage of the normal low-level signal VGL. As such, the gate-source voltage Vgs (M8) of the first voltage stabilization transistor M8 may be greater than zero, and the first voltage stabilization transistor M8 may be controlled to be fully turned off. As such, the operation state of the voltage stabilization circuit 30 may not affected by process errors.

In another optional embodiment, the signal of the first voltage terminal VG1 is a second constant voltage signal, and the second constant voltage signal is an enable signal of the first voltage stabilization transistor M8. In one embodiment, the first voltage stabilization transistor M8 is an N-type transistor. Still referring to FIGS. 8 and 9, the second constant voltage signal of the first voltage terminal VG1 may be a normal high-level signal VGH. In some other optional embodiments, when the first voltage stabilization transistor M8 is a P-type transistor, the second constant voltage signal of the first voltage terminal VG1 may be a normal low-level signal VGL (not shown in FIGS. 8 and 9).

As such, compared with setting the signal of the first voltage terminal VG1 as a non-constant voltage signal such as a clock signal, setting the signal of the first voltage terminal VG1 as a second constant signal may reduce the load of the constant signal, thereby reducing signal delay. Accordingly, the level abnormality of the first node Q1 and/or the third node Q3 caused by the signal delay of the clock signal may be avoided, the stability of the first output signal output by the output circuit 20 may be improved, and normal operations of the pixel circuit PX may not be affected. In addition, by setting the signal of the first voltage terminal VG1 to be a constant enable level signal, the gate-source voltage Vgs (M8) and/or the gate-drain voltage Vgd (M8) of the first voltage stabilization transistor M8 may be reduced. Accordingly, the gate-source voltage Vgs (M8) and/or the gate-drain voltage Vgd (M8) of the first voltage stabilization transistor M8 may be prevented from exceeding a reasonable range, and the reliability of the first voltage stabilization transistor M8 may thus be improved.

In another optional embodiment, during at least a part of the period when the signal of the third node Q3 is at the enable level, the absolute value of the voltage of the third node Q3 is greater than the absolute value of the voltage of the first auxiliary voltage terminal VF1. In this way, when the first auxiliary transistor M9 is an N-type transistor and the enable level is at a high level, during at least a part of the period when the signal of the third node Q3 is at a high level, the gate-source voltage Vgs (M9) of the first auxiliary transistor M9 may be greater than zero, and thus the first auxiliary transistor M9 may be turned on. When the first auxiliary transistor M9 is a P-type transistor and the enable level is at a low level, during at least a part of the period when the signal of the third node Q3 is at a low level, the gate-source voltage Vgs (M9) of the first auxiliary transistor M9 may be lower than zero, and thus the first auxiliary transistor M9 may be turned on.

Exemplarily, with continued reference to FIGS. 8 and 9, the output circuit 20 may include a first output transistor M6, a second output transistor M7 and a first coupling capacitor C2. A gate of the first output transistor M6 is electrically connected to the third node Q3, and a gate of the second output transistor M7 is electrically connected to the second node Q2. A first electrode of the first output transistor M6 is electrically connected to the second voltage terminal VG2, and a first electrode of the second output transistor M7 is electrically connected to the third voltage terminal VG3. A second electrode of the first output transistor M6 and a second electrode of the second output transistor M7 each are electrically connected to the output terminal VOUT. A first plate of the first coupling capacitor C2 is electrically connected to the third node Q3, and a second plate of the first coupling capacitor C2 is electrically connected to the output terminal VOUT.

In an optional embodiment, the transistors in the shift register unit 03 each are N-type transistors. The enable levels related to the shift register unit 03 each are high levels, and the non-enable levels each are low levels. The signal of the second voltage terminal VG2 may be a constant normal high-level signal VGH, and the signal of the third voltage terminal VG3 may be a constant normal low-level signal VGL. When the third node Q3 is at a high level, the first output transistor M6 may be turned on, and the first output transistor M6 may transmit the normal high-level signal VGH of the second voltage terminal VG2 to the output terminal VOUT. The first coupling capacitor C2 may couple and pull up the voltage of the third node Q3 when the voltage of the output terminal VOUT is pulled up. After being coupled and pulled up, the voltage of the third node Q3 is V1. The voltage V1 of the third node Q3 after being coupled and pulled up may be greater than the voltage of the enhanced high-level signal HVGH of the first auxiliary voltage terminal VF1. As such, the gate-source voltage Vgs (M9) of the first auxiliary transistor M9 may be greater than the threshold voltage Vth (M9), and the first auxiliary transistor M9 may be controlled to be turned on. The voltage V1 of the third node Q3 after being coupled and pulled high may also be greater than the voltage of the normal high-level signal VGH of the second voltage terminal VG2. As such, when the signal of the third node Q3 is at the enable level, the first output transistor M6 may be fully turned on. Accordingly, the stability of the output terminal VOUT may be maintained, the nodes in the pixel circuit PX may be written with accurate signals, and the display effect may thus be improved.

In one embodiment, the voltage V1 may be twice the voltage of a normal high-level signal VGH, or a voltage close to twice the voltage of a normal high-level signal VGH.

It should be noted that in FIG. 9, the signal of the third node Q3 may not directly change from a low-level signal to an electrical signal with a voltage of V1. Under the action of the input circuit 10 and the voltage stabilization circuit 30, the signal of the third node Q3 may first change from a low-level signal to a normal high-level signal VGH. At this time, the signal of the first node Q1 and the first auxiliary node F1 may be a normal high-level signal VGH. The first output transistor M6 may be turned on, and the voltage of the output terminal VOUT may be pulled up. Under the action of the first coupling capacitor C2, the signal of the third node Q3 may quickly change from the normal high-level signal VGH to an electrical signal with a voltage of V1. At this time, the first auxiliary transistor M9 may be turned on, and the signals of the first node Q1 and the first auxiliary node F1 may be enhanced high-level signals HVGH. Since the first voltage stabilization transistor M8 is turned off under the control of the first auxiliary node F1 and the first voltage terminal VG1, there may be no leakage between the first auxiliary node F1 and the third node Q3. Since the signal of the second voltage terminal VG2 may be a constant voltage high-level signal, and the above change and coupling process may be completed in a short time after the signal of the third node Q3 changes from a low level to a high level, the signal change process of the third node Q3 is not shown in FIG. 9.

It should also be noted that, though the signal of the third node Q3 may not directly change from a low-level signal to an electrical signal with a voltage of V1, the signal of the third node Q3 may directly change from an electrical signal with a voltage of V1 to a low-level signal. In the third period t3, the input terminal VIN and the first clock terminal VCK may each be at a high level, and the low-level signal of the input terminal VIN may be transmitted to the first node Q1. Under the control of the first node Q1, the first voltage stabilization transistor M8 may be turned on, and the signals of the first node Q1 and the third node Q3 may be directly pulled down to a low level.

Figure 10:
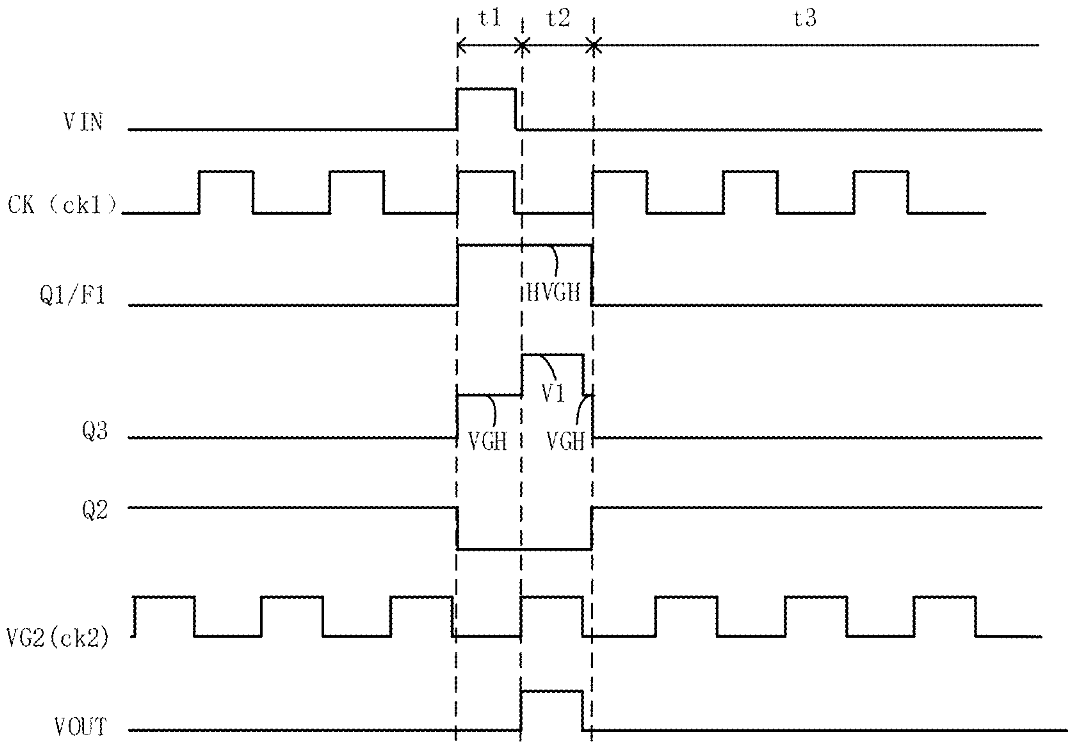
FIG. 10 illustrates a timing diagram of another shift register unit consistent with the disclosed embodiments of the present disclosure.

FIG. 10 illustrates a timing diagram of another shift register unit consistent with the disclosed embodiments of the present disclosure. The timing diagram may be used to drive the shift register unit 03 provided in FIG. 8. In another optional embodiment, referring to FIGS. 8 and 10, the transistors in the shift register unit 03 each are N-type transistors. The enable levels related to the shift register unit 03 each are high levels, and the non-enable levels each are low levels. The signal of the second voltage terminal VG2 may be a non-constant voltage signal, for example, the signal of the second voltage terminal VG2 may be a second clock signal ck2.

The second clock signal ck2 of the second voltage terminal VG2 may also be a pulse signal in which a high-level signal and a low-level signal are alternately arranged. The high-level signal and the low-level signal consecutive thereto form a pulse cycle. In one embodiment, the second clock signal ck2 may differ from the first clock signal ck1 by half a cycle. That is, when the first clock signal ck1 is a high-level signal, the second clock signal ck2 may be a low-level signal, and vice versa, when the first clock signal ck1 is a low-level signal, the second clock signal ck2 may be a high-level signal. In another embodiment, the input terminal VIN of the (i+1)-th stage shift register unit 03(*i*+1) may be electrically connected to the output terminal VOUT of the i-th stage shift register unit 03(*i*); the first clock terminal VCK of the (i+1)-th stage shift register unit 03(*i*+1) may be electrically connected to the second voltage terminal VG2 of the i-th stage shift register unit 03(*i*); and/or, the second voltage terminal VG2 of the (i+1)-th stage shift register unit 03(*i*+1) may be electrically connected to the first clock terminal VCK of the i-th stage shift register unit 03(*i*) (not shown in FIG. 8), where i is a positive integer.

In one embodiment, still referring to FIGS. 8 and 10, in the first period t1, when the third node Q3 is at a high level, the first output transistor M6 may be turned on, and the first output transistor M6 may transmit the second clock signal ck2 of the second voltage terminal VG2 to the output terminal VOUT. In this period, the second clock signal ck2 may be at a low level, and the output terminal VOUT may be still at a low level. The signal of the third node Q3 may not be coupled and pulled high by the first coupling capacitor C2, and the third node Q3 may be still a normal high-level signal VGH. In the second period t2, the second clock signal ck2 may change from a low level to a high level. In this process, the first output transistor M6 may be turned on, such that the first output signal of the output terminal VOUT may also change from a low level to a high level, and the signal of the third node Q3 may be coupled and pulled up to V1 by the first coupling capacitor C2. The second clock signal ck2 may also change from a high level to a low level. In this process, the first output transistor M6 may also be turned on, such that the first output signal of the output terminal VOUT may also change from a high level to a low level, and the signal of the third node Q3 may be coupled by the first coupling capacitor C2 and pulled down to VGH. In the third period t3, the signals of the first node Q1 and the third node Q3 may each be pulled down to a low level, and the signal of the second node Q2 may change from a low level to a high level.

In one embodiment, the output circuit 20 may also include a first storage capacitor C3. A first plate of the first storage capacitor C3 is electrically connected to the second node Q2, and a second plate of the first storage capacitor C3 is electrically connected to the third voltage terminal VG3 of the constant voltage. Accordingly, the high level of the second node Q2 may be maintained.

In another embodiment, still referring to FIGS. 8 and 10, the size of the first auxiliary transistor M9 (the active area of the active layer, that is, the overlapping area of the vertical projections of the gate and the active layer on the plane where the display panel 01 is located) may be small. The threshold voltage Vth (M9) may be also small. As such, the first auxiliary transistor M9 may be easily turned on. When the signal of the third node Q3 is a high-level signal, the first auxiliary transistor M9 may be turned on to transmit the enhanced high-level signal HVGH of the first auxiliary voltage terminal VF1 to the first auxiliary node F1 and the first node Q1. Accordingly, in the first period t1, when the signal of the third node Q3 is a normal high-level signal VGH, the first auxiliary node F1 and the first node Q1 may change to the enhanced high-level signal HVGH.

It should be noted that the above description only illustrates the signal change process of the first node Q1 and the first auxiliary node F1, and the signal change process of the third node Q3 in FIGS. 9 and 10. The present disclosure is not limited to the above description. In some other optional embodiments, the transistors in the shift register unit 03 may each be P-type transistors, and the enable levels related to the shift register unit 03 may each be low levels. When the second voltage terminal VG2 is a non-constant voltage signal, the signal may also be unrelated to the first clock signal ck1. In the present disclosure, a specific operation sequence of the shift register unit 03 may be set according to actual needs.

Figure 11:
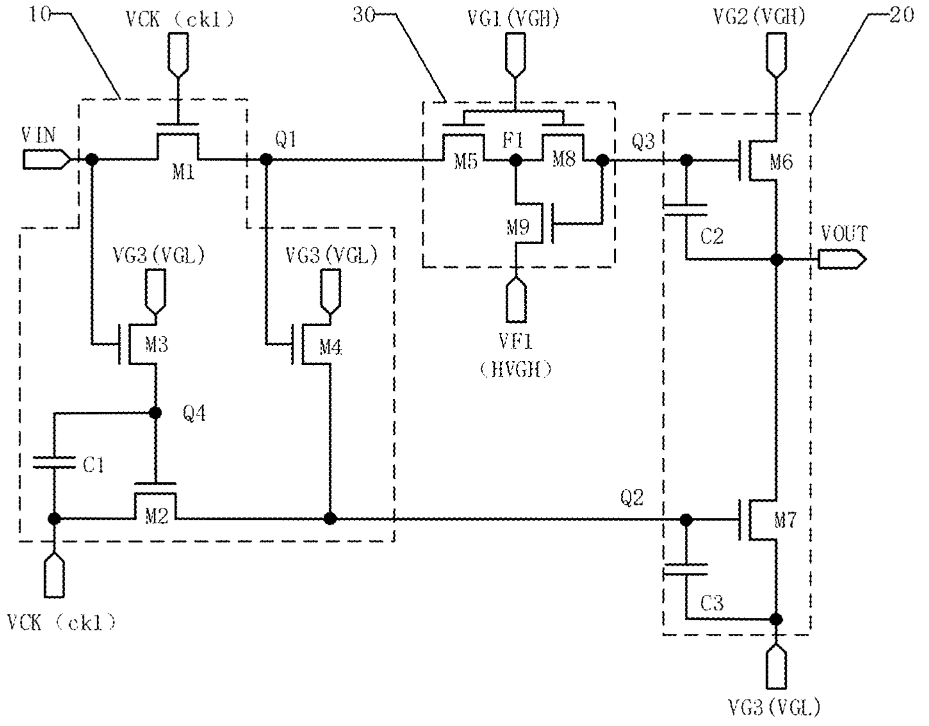
FIG. 11 illustrates a schematic circuit structural diagram of another shift register unit consistent with the disclosed embodiments of the present disclosure.

FIG. 11 illustrates a schematic circuit structural diagram of another shift register unit consistent with the disclosed embodiments of the present disclosure. Referring to FIG. 11, the voltage stabilization circuit 30 may also include a protection transistor M5. A first electrode of the protection transistor M5 is electrically connected to the first node Q1, a second electrode of the protection transistor M5 is electrically connected to the first auxiliary node F1, and a gate of the protection transistor M5 is electrically connected to the first voltage terminal VG1.

In one embodiment, the transistors in the shift register unit 03 each are N-type transistors and the enable levels related to the shift register unit 03 each are high levels. Referring to FIG. 11, when the signal of the third node Q3 is at a high level, the first auxiliary transistor M9 is controlled to be turned on, and the enhanced high-level signal HVGH of the first auxiliary voltage terminal VF1 is transmitted to the first auxiliary node F1, the protection transistor M5 may isolate and interrupt the transmission path between the first auxiliary node F1 and the first node Q1, and the level of the first node Q1 may thus be stabilized. As such, the enhanced high-level signal HVGH of the first auxiliary node F1 may be prevented from being transmitted to the first node Q1, and the level of the first node Q1 may not be too high. Accordingly, when the input signal of the input terminal IN is at a low level, the low level of the input signal may be smoothly transmitted to the first node Q1, and the input transistor (M1) may not be broken down and burned. In an optional embodiment, when the first node Q1 and the third node Q3 each are at an enable high level, the signal of the first node Q1 may be stabilized as a normal high-level signal VGH, or stabilized as an electrical signal close to the normal high-level signal VGH.

In an optional embodiment, the area of the active region of the active layer of the first auxiliary transistor M9 (i.e., the overlapping area of the vertical projections of the gate and the active layer on the plane where the display panel 01 is located) may be smaller than the area of the active region of the active layer of the protection transistor M5.

In one embodiment, the transistors in the shift register unit 03 each are N-type transistors and the enable levels related to the shift register unit 03 each are high levels. The size of the first auxiliary transistor M9 may be small, the channel width of the first auxiliary transistor M9 may be small, and the channel current may thus be reduced. When the first node Q1 is at a low level and pulls down the first auxiliary node F1, the first auxiliary transistor M9 may not compete with the protection transistor M5 for the level of the first auxiliary node F1. The speed at which the first auxiliary transistor M9 charges and pulls up the first auxiliary node F1 may be slower than the speed at which the protection transistor M5 pulls down the first auxiliary node F1. That is, when the first auxiliary transistor M9 and the protection transistor M5 each are turned on, the level of the first auxiliary node F1 is preferentially controlled by the protection transistor M5. In this way, when the first node Q1 is at a low level, the protection transistor M5 may smoothly pull down the level of the first auxiliary node F1, such that the first voltage stabilization transistor M8 may be turned on, and the third node Q3 may be pulled down to a low level. Simultaneously, when the first node Q1 is at a low level, the second node Q2 may be at a high level, such that the output circuit 20 may control the output terminal VOUT to change to the low-level signal of the third voltage terminal VG3. The signal of the third node Q3 may be coupled and pulled down to the normal high-level signal VGH by the first coupling capacitor C2. As such, the channel current of the first auxiliary transistor M9 may be reduced. Accordingly, the protection transistor M5 may quickly lower the level of the first auxiliary node F1, control the first voltage stabilization transistor M8 to be turned on. As such, the signal of the third node Q3 may quickly change to a low level, and control the first output transistor M6 to be turned off.

Referring to FIGS. 8 and 11, the input circuit 10 may include a first input transistor M1. A first electrode of the first input transistor M1 is electrically connected to the input terminal VIN, a second electrode of the first input transistor M1 is electrically connected to the first node Q1, and a gate of the first input transistor M1 is electrically connected to the first clock terminal VCK. A channel length of the protection transistor M5 may be greater than or equal to a channel length of the first input transistor M1.

By setting the channel length of the protection transistor M5 to be relatively large, the absolute value of the threshold voltage Vth (M5) of the protection transistor M5 may be increased, and the fault tolerance range of the threshold voltage of the transistor M5 may be improved. As such, the requirements for uniformity of the preparation process may be lowered, the difficulty of preparation may be reduced, and the preparation costs may be reduced. In addition, since the absolute value of the threshold voltage Vth (M5) of the protection transistor M5 may be increased, the leakage current may be reduced. Accordingly, the stability of the first node Q1 may be maintained, the first input transistor M1 may be protected, and the reliability of the circuit may thus be improved.

In an optional embodiment, the channel length of the protection transistor M5 may be greater than or equal to the channel length of the output transistor (M6, M7).

Still referring to FIGS. 8 and 11, the input circuit 10 may also include a second input transistor M2, a third input transistor M3, a fourth input transistor M4, and a second coupling capacitor C1. A gate of the third input transistor M3 is electrically connected to the input terminal VIN, and a first electrode of the third input transistor M3 is electrically connected to the third voltage terminal VG3. A second electrode of the third input transistor M3 and a gate of the second input transistor M2 are electrically connected to the fourth node Q4. A first electrode of the second input transistor M2 is electrically connected to the first clock terminal VCK, and a second electrode of the second input transistor M2 is electrically connected to the second node Q2. A gate of the fourth input transistor M4 is electrically connected to the first node Q1, and a first electrode of the fourth input transistor M4 is electrically connected to the third voltage terminal VG3. A second electrode of the fourth input transistor M4 is also electrically connected to the second node Q2. A first plate of the second coupling capacitor C1 is electrically connected to the first clock terminal VCK, and a second plate of the second coupling capacitor C1 is electrically connected to the fourth node Q4.

A channel length of the first input transistor M1 is greater than one or more of the channel lengths of the second input transistor M2, the third input transistor M3, and the fourth input transistor M4.

Figure 12:
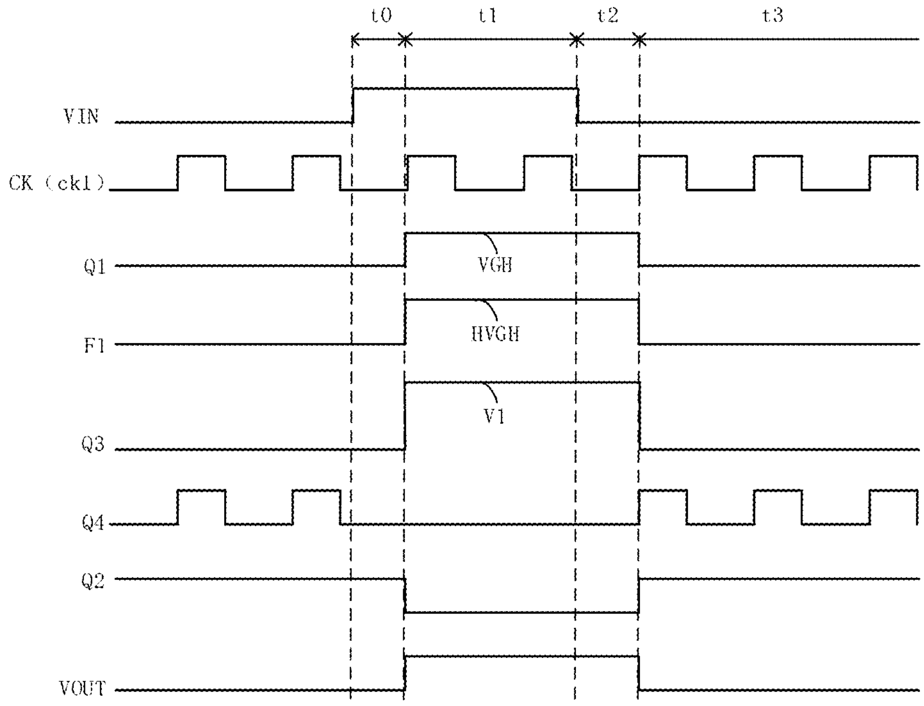
FIG. 12 illustrates a timing diagram of another shift register unit consistent with the disclosed embodiments of the present disclosure.

In one embodiment, the transistors in the shift register unit 03 each are N-type transistors and the enable levels related to the shift register unit 03 each are high levels. FIG. 12 illustrates a timing diagram of another shift register unit consistent with the disclosed embodiments of the present disclosure. The timing diagram may be used to drive the shift register unit 03 provided in FIG. 11. Referring to FIGS. 11 and 12, in the initial period to, the input signal of the input terminal VIN changes to a high level, the third input transistor M3 is turned on, and the low-level signal of the third voltage terminal VG3 may be transmitted to the fourth node Q4. The first clock signal ck1 of the first clock terminal VCK is at a low level, and the first input transistor M1 is turned off. The first node Q1 is still at a low level, and the fourth input transistor M4 is turned off. The second node Q2 is still at a high level, the first output transistor M6 is turned off, and the second output transistor M7 is turned on. The output terminal VOUT may output a low-level signal of the third voltage terminal VG3. In this stage, the voltage difference between the first electrode and the second electrode of the first input transistor M1 may be relatively large, and leakage may occur. As such, the level at the first node Q1 may be unstable, and the reliability of the circuit may be affected.

In the first period t1, the input signal of the input terminal VIN and the first clock signal ck1 of the first clock terminal VCK each have a high level, and the third input transistor M3 is turned on. The fourth node Q4 continues to maintain a low level, and the first input transistor M1 is also turned on, transmitting the high-level signal of the input terminal VIN to the first node Q1. The first node Q1 and the third node Q3 are at a high level, such that the fourth input transistor M4 is turned on, and the low-level signal of the third voltage terminal VG3 may be transmitted to the second node Q2. The second node Q2 is at a low-level, and the first output transistor M6 is turned on. The second output transistor M7 is turned off, and the output terminal VOUT may output a high-level signal of the second voltage terminal VG2.

In the second period t2, the input signal of the input terminal VIN changes to a low level, and the first clock signal ck1 of the first clock terminal VCK also changes to a low level. The first input transistor M1 is turned off, and the low level of the input terminal VIN may not be transmitted to the first node Q1. The first node Q1 is still at a high level, and the fourth input transistor M4 is turned on. The second node Q2 is still at a low level, and the output terminal VOUT outputs a high-level signal of the second voltage terminal VG2. In this stage, the voltage difference between the first electrode and the second electrode of the first input transistor M1 may be relatively large, and leakage may occur. As such, the level at the first node Q1 may be unstable, and the reliability of the circuit may be affected.

In the third period t3, the input signal of the input terminal VIN is at a low level, the first clock signal ck1 of the first clock terminal VCK changes to a high level, and the third input transistor M3 is turned off. The first input transistor M1 is turned on, and the low-level signal of the input terminal VIN is transmitted to the first node Q1. The first node Q1 and the third node Q3 are at a low level, and the fourth input transistor M4 is turned off. Simultaneously, the second coupling capacitor C1 couples and pulls up the signal of the fourth node Q4. As such, the second input transistor M2 is turned on, and the high-level signal of the first clock terminal VCK is transmitted to the second node Q2. The second node Q2 is at a high level, the first output transistor M6 is turned off, the second output transistor M7 is turned on, and the output terminal VOUT outputs a low-level signal of the third voltage terminal VG3.

By setting the channel length of the first input transistor M1 to be relatively large, the transmission path between the first electrode and the second electrode of the first input transistor M1 may be increased, and the increase of the leakage current may be limited. As such, leakage current, especially the leakage current in the initial stage t0 and the second period t2, may be reduced, and circuit reliability may be improved.

In an optional embodiment, the channel length of the first input transistor M1 is greater than or equal to the channel length of the output transistor (M6, M7).

Figure 13:
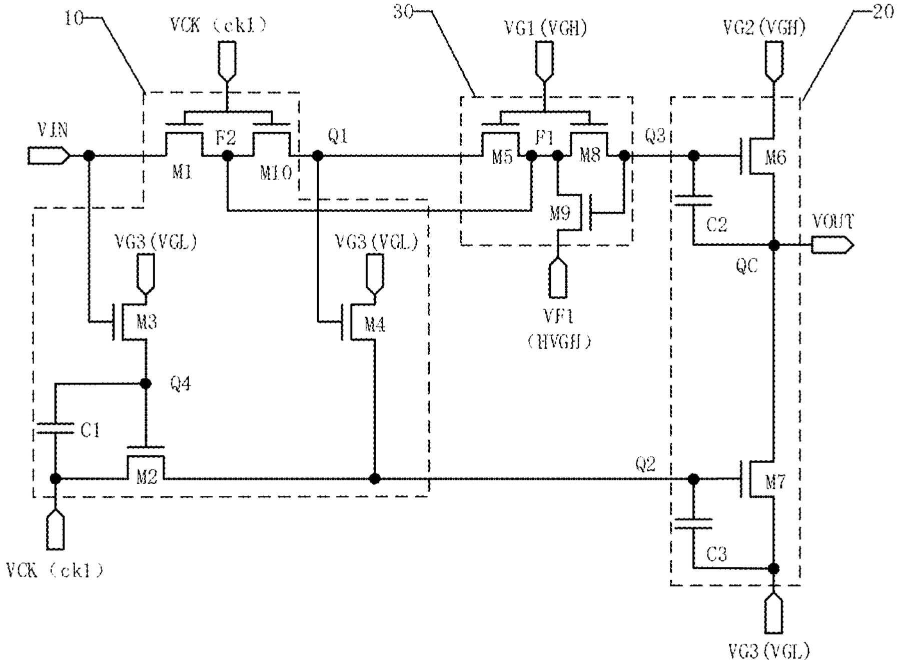
FIG. 13 illustrates a schematic circuit structural diagram of another shift register unit consistent with the disclosed embodiments of the present disclosure.

FIG. 13 illustrates a schematic circuit structural diagram of another shift register unit consistent with the disclosed embodiments of the present disclosure. Referring to FIG. 13, the input circuit 10 includes a first input transistor M1 and a second voltage stabilization transistor M10. A first electrode of the first input transistor M1 is electrically connected to the input terminal VIN, and a second electrode of the first input transistor M1 and a first electrode of the second voltage stabilization transistor M10 are electrically connected to the second auxiliary node F2. A second electrode of the second voltage stabilization transistor M10 is electrically connected to the first node Q1. A gate of the first input transistor M1 and a gate of the second voltage stabilization transistor M10 each are electrically connected to the first clock terminal VCK. The second auxiliary node F2 is electrically connected to the first auxiliary node F1.

The timing diagram provided in FIG. 12 may also be configured to drive the shift register unit 03 provided in FIG. 13. In one embodiment, the transistors in the shift register unit 03 each are N-type transistors, and the enable levels related to the shift register unit 03 each are high levels. Referring to FIGS. 12 and 13, in the initial period t0, the input signal of the input terminal VIN has changed to a high level, but the first clock signal ck1 of the first clock terminal VCK is at a low level. As such, the high-level signal of the input terminal VIN may not be transmitted to the first node Q1. The first node Q1 and the third node Q3 are still at a low level, and the second node Q2 is still at a high level. The second auxiliary node F2 is electrically connected to the first auxiliary node F1, such that the signal of the second auxiliary node F2 is a low-level signal of the first auxiliary node F1. As such, the source-drain voltage Vds (M1) of the first input transistor M1 may be reduced, the leakage current of the first input transistor M1 may be reduced, and the stability of the signal of the second auxiliary node F2 may be maintained. As a result, the source-drain voltage Vds (M10) of the second voltage stabilization transistor M10 may be reduced, the leakage current of the second voltage stabilization transistor M10 may be reduced, and the signal stability of the first node Q1 may be maintained. Accordingly, leakage current may be prevented from pulling up the level of the first node Q1, causing the signal of the second node Q2 to be pulled down in advance, and affecting the stability of the circuit.

In the second period t2, the input signal of the input terminal VIN has changed to a low level, but the first clock signal ck1 of the first clock terminal VCK is at a low level. As such, the first input transistor M1 and the second voltage stabilization transistor M10 may be turned off, and the low-level signal of the input terminal VIN may not be transmitted to the first node Q1. The first node Q1 and the third node Q3 are still at a high level, and the second node Q2 is still at a low level. The second auxiliary node F2 is electrically connected to the first auxiliary node F1, such that the signal of the second auxiliary node F2 may be stabilized as the enhanced high-level signal HVGH. As such, the source-drain voltage Vds (M10) of the second voltage stabilization transistor M10 may be reduced, and the leakage current of the second voltage stabilization transistor M10 may be reduced. As a result, the signal stability of the first node Q1 may be maintained, and leakage current pulling down the level of the first node Q1 may be avoided. Accordingly, the second node Q2 may maintain a low level, the first output transistor M6 and the second output transistor M7 may not be turned on simultaneously. As a result, abnormally large current may be avoided, and circuit safety may be improved.

In an optional embodiment, the channel length of the first input transistor M1 is greater than one or more of the channel lengths of other transistors in the input circuit 10, such as the second voltage stabilization transistor M10, the second input transistor M2, the third input transistor M3, and the fourth input transistor M4. By setting the channel length of the first input transistor M1 to be relatively large, the transmission path between the first electrode and the second electrode of the first input transistor M1 may be increased, thereby limiting the increase of the leakage current. As such, the leakage current, especially the leakage current in the initial period t0 and the second period t2 may be reduced, and circuit reliability may be improved. In addition, in the second period t2, the signal of the input terminal VIN is a low-level signal, and the signal of the second auxiliary node F2 is a high-level signal. By reducing the leakage current of the first input transistor M1, the loss of charge from the second auxiliary node F2 to the first node Q1 may be reduced, and power consumption may be decreased.

Figure 14:
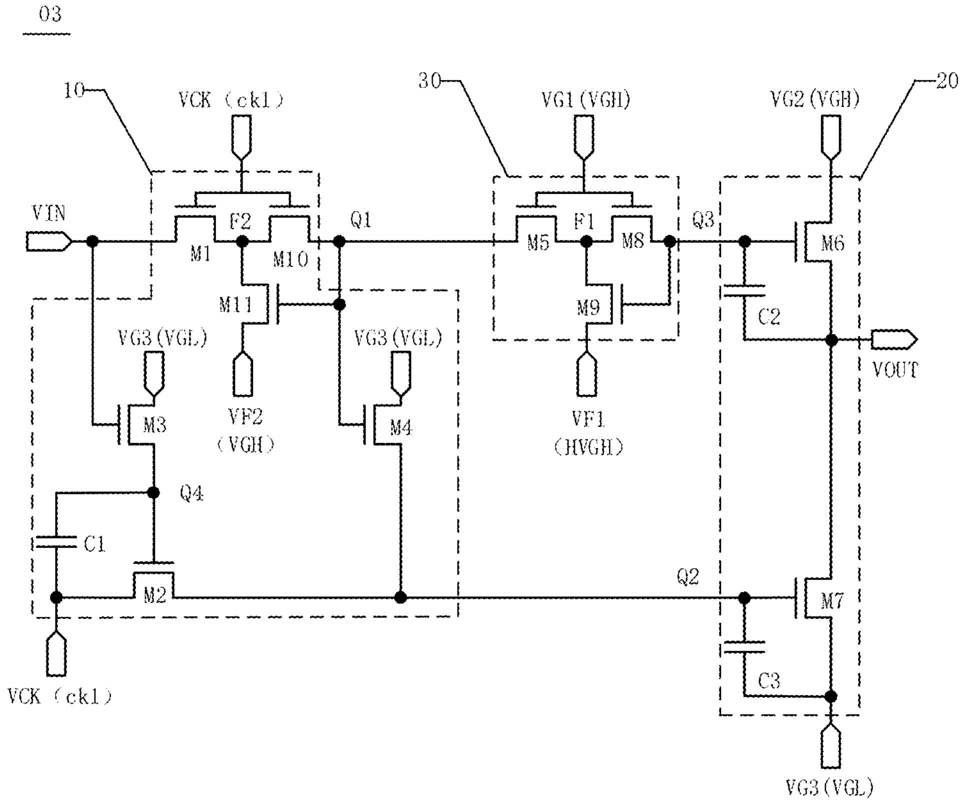
FIG. 14 illustrates a schematic circuit structural diagram of another shift register unit consistent with the disclosed embodiments of the present disclosure.

FIG. 14 illustrates a schematic circuit structural diagram of another shift register unit consistent with the disclosed embodiments of the present disclosure. Referring to FIG. 14, the shift register unit 03 may also include a second auxiliary voltage terminal VF2. The input circuit 10 includes a first input transistor M1, a second voltage stabilization transistor M10, and a second auxiliary transistor M11. A first electrode of the first input transistor M1 is electrically connected to the input terminal VIN. A second electrode of the first input transistor M1 and a first electrode of the second voltage stabilization transistor M10 are electrically connected to the second auxiliary node F2. A second electrode of the second voltage stabilization transistor M10 is electrically connected to the first node Q1. A gate of the first input transistor M1 and a gate of the second voltage stabilization transistor M10 each are electrically connected to the first clock terminal VCK. A first electrode of the second auxiliary transistor M11 is electrically connected to the second auxiliary voltage terminal VF2, a second electrode of the second auxiliary transistor M11 is electrically connected to the second auxiliary node F2, and a gate of the second auxiliary transistor M11 is electrically connected to the first node Q1.

The timing diagram provided in FIG. 12 may also be used to drive the shift register unit 03 provided in FIG. 13. In one embodiment, the transistors in the shift register unit 03 each are N-type transistors, and the enable levels related to the shift register unit 03 each are high levels. Referring to FIGS. 12 and 13, in the second period t2, the input terminal VIN is at a low level, the first node Q1 is at a high level, and the first input transistor M1 and the second voltage stabilization transistor M10 may be turned off. The second auxiliary transistor M11 may be turned on under the control of the first node Q1, write the signal of the second auxiliary voltage terminal VF2 to the second auxiliary node F2, and reduce the source-drain voltage Vds (M10) of the second voltage stabilization transistor M10. As such, the leakage current between the second auxiliary node F2 and the first node Q1 may be reduced, and the high level of the first node Q1 may be maintained. The fourth input transistor M4 may be turned on, and the low-level signal of the third voltage terminal VG3 may be transmitted to the second node Q2. Accordingly, leakage current pulling down the level of the first node Q1 may be avoided, the second node Q2 may maintain a low level, and the first output transistor M6 and the second output transistor M7 may not be turned on simultaneously. As a result, abnormally large current may be avoided, and circuit safety may be improved.

Compared with the connection between the second auxiliary node F2 and the first auxiliary node F1 in FIG. 13, in one embodiment, the second auxiliary node F2 is connected to the second auxiliary voltage terminal VF2 through the second auxiliary transistor M11. The signal of the second auxiliary voltage terminal VF2 may be set according to actual needs. As such, the voltage of the second electrode of the first input transistor M1 may be prevented from being too large, and the source-drain voltage Vds (M1) of the first input transistor M1 may not be too large in the off state. As a result, the transistor M1 may not be easily broken down, and the reliability of the circuit may be improved. In addition, the voltage of the second electrode of the first input transistor M1 may not be too large, and the second voltage stabilization transistor M10 may be turned on to transmit the signal of the input terminal VIN to the first node Q1. As such, the normal operation of the shift register unit 03 may be achieved.

In an optional embodiment, the channel length of the first input transistor M1 is greater than one or more of the channel lengths of other transistors in the input circuit 10, such as the second voltage stabilization transistor M10, the second auxiliary transistor M11, the second input transistor M2, the third input transistor M3, and the fourth input transistor M4. By setting the channel length of the first input transistor M1 to be relatively large, the transmission path between the first electrode and the second electrode of the first input transistor M1 may be increased, thereby limiting the increase of the leakage current. As such, leakage current, especially the leakage current in the initial period t0 and the second period t2, may be reduced, and circuit reliability may be improved. In addition, in the second period t2, the signal of the input terminal VIN is a low-level signal, and the signal of the second auxiliary node F2 is a high-level signal close to the signal of the first node Q1. By reducing the leakage current of the first input transistor M1, the loss of charge from the second auxiliary node F2 to the first node Q1 may be reduced, and power consumption may be decreased.

In an optional embodiment, the signal of the second auxiliary voltage terminal VF2 is a third constant voltage signal. The voltage of the third constant voltage signal is equal to the voltage when the signal of the input terminal VIN is at an enable level, and/or, the voltage of the third voltage signal is equal to the voltage of the second voltage terminal VG2.

In one embodiment, the transistors in the shift register unit 03 each are N-type transistors, and the enable levels related to the shift register unit 03 each are high levels. The signal of the second auxiliary voltage terminal VF2 may be a constant normal high-level signal VGH. In an optional embodiment, the input terminal VIN of the (i+1)-th stage shift register unit 03(*i*+1) may be electrically connected to the output terminal VOUT of the i-th stage shift register unit 03(*i*) (not shown in FIG. 14), where i is a positive integer. When the output terminal VOUT of the i-th stage shift register unit 03(*i*) outputs the normal high-level signal VGH of the second voltage terminal VG2, the signal of the input terminal VIN of the (i+1)-th stage shift register unit 03(*i*+1) may be also the normal high-level signal VGH. When the first clock terminal VCK of the (i+1)-th stage shift register unit 03(*i*+1) is a high-level signal, the signal of the first node Q1 of the (i+1)-th stage shift register unit 03(*i*+1) may be a normal high-level signal VGH of the input terminal VIN.

In one embodiment, the voltage of the third constant voltage signal of the second auxiliary voltage terminal VF2 may be set to the voltage when the signal of the input terminal VIN is at the enable level, or the voltage when the second voltage terminal VG2 is at the enable level. As such, when the signal of the first node Q1 is at the enable level, the second auxiliary transistor M11 may be controlled to be turned on, and thus the voltage of the second auxiliary node F2 may be equal to the voltage of the first node Q1. Accordingly, the leakage current of the second voltage stabilization transistor M10 may be reduced, and the reliability of the first input transistor M8 may be improved.

In another optional embodiment, the area of the active region of the active layer of the second auxiliary transistor M11 (i.e., the overlapping area of the vertical projections of the gate and the active layer on the plane where the display panel 01 is located) is smaller than the area of the active region of the active layer of the first input transistor M1.

In one embodiment, the transistors in the shift register unit 03 each are N-type transistors, and the enable levels related to the shift register unit 03 each are high levels. The size of the second auxiliary transistor M11 is relatively small. As such, the channel width of the second auxiliary transistor M11 may be relatively small, and the channel current may be reduced. When the input terminal VIN is at a low level and the second auxiliary node F2 is pulled down, the second auxiliary transistor M11 may not compete with the first input transistor M1 for the level of the second auxiliary node F2.

The speed at which the second auxiliary transistor M11 charges and pulls up the first auxiliary node F1 may be lower than the speed at which the first input transistor M1 pulls down the second auxiliary node F2. That is, when the second auxiliary transistor M11 and the first input transistor M1 each are turned on, the level of the second auxiliary node F2 may be preferentially controlled by the protection transistor M5. In this way, when the input terminal VIN is at a low level and the first clock terminal VCK is at a high level, the first input transistor M1 may smoothly pull down the level of the second auxiliary node F2. Accordingly, the second voltage stabilization transistor M10 may be turned on, and the first node Q1 may be pulled down to a low level.

Figure 15:
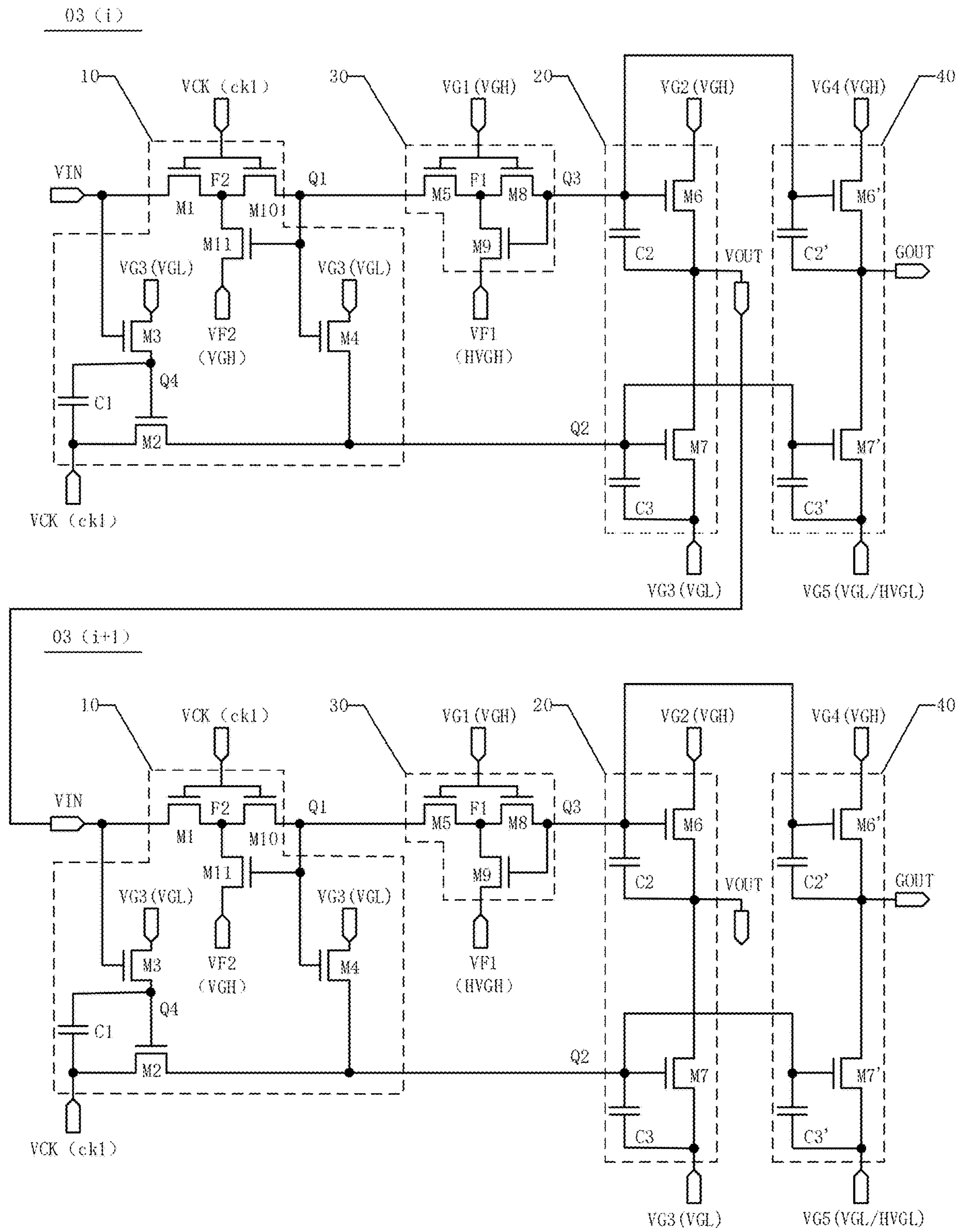
FIG. 15 illustrates a schematic circuit structural diagram of another shift register unit consistent with the disclosed embodiments of the present disclosure.

FIG. 15 illustrates a schematic circuit structural diagram of another shift register unit consistent with the disclosed embodiments of the present disclosure. Referring to FIG. 15, the shift register unit 03 may also include a scanning circuit 40. The shift register unit 03 may also include a fourth voltage terminal VG4, a fifth voltage terminal VG5 and a scanning terminal GOUT. The scanning circuit 40 is electrically connected to the third node Q3, the second node Q2, the fourth voltage terminal VG4, the fifth voltage terminal VG5 and the scanning terminal GOUT respectively. The scanning circuit 40 is configured for controlling the second output signal output by the scanning terminal GOUT according to the signal of the third node Q3 and the signal of the second node Q2. The output terminal VOUT of the i-th stage shift register unit 03(*i*) is electrically connected to the input terminal VIN of the (i+1)-th stage shift register unit 03(*i*+1), where i is a positive integer. The scanning terminal GOUT of the i-th stage shift register unit 03(*i*) is electrically connected to the pixel circuit PX in the display panel 01.

Specifically, during at least a part of the period when the signal of the third node Q3 is at the enable level, the signal of the fourth voltage terminal VG4 is at the enable level, such that the scanning circuit 40 may control the scanning terminal GOUT to stably output the enable level of the second output signal. During the period when the signal of the second node Q2 is at the enable level, the signal of the fifth voltage terminal VG5 may be at the non-enable level. As such, the scanning circuit 40 may control the scanning terminal GOUT to stably output the second output signal of the non-enable level. In an optional embodiment, the signal of the fourth voltage terminal VG4 may be a constant voltage signal or a non-constant voltage signal such as a clock signal, and the signal of the fifth voltage terminal VG5 may be a constant voltage signal.

Figure 16:
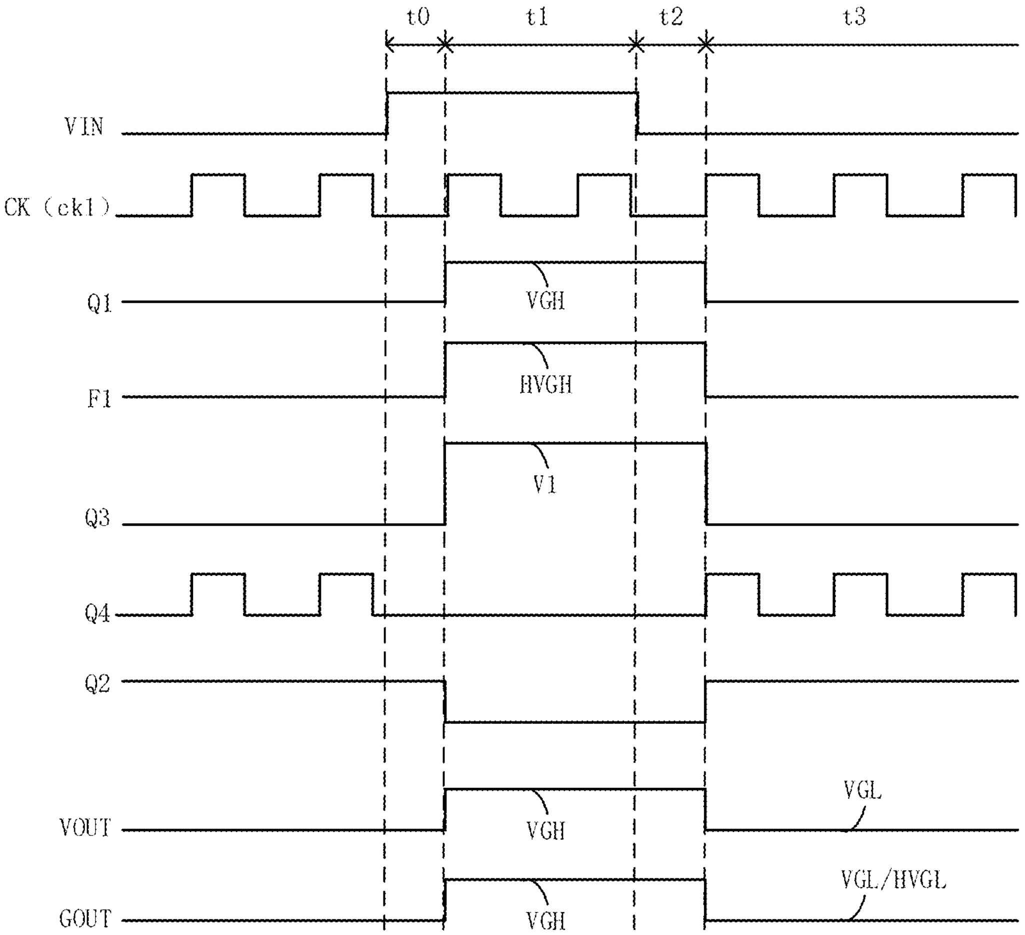
FIG. 16 illustrates a timing diagram of another shift register unit consistent with the disclosed embodiments of the present disclosure.

In one embodiment, the transistors in the shift register unit 03 each are N-type transistors, and the enable levels related to the shift register unit 03 each are high levels. FIG. 16 illustrates a timing diagram of another shift register unit consistent with the disclosed embodiments of the present disclosure. The timing diagram may be used to drive the shift register unit 03 provided in FIG. 15. Referring to FIGS. 15 and 16, in the first period t1 and the second period t2, the signal of the first node Q1 and the signal of the third node Q3 each are high-level signals, and the signal of the second node Q2 is a low-level signal. The signals at the output terminal VOUT of the output circuit 20 and the scanning terminal GOUT of the scanning circuit 40 may change to high-level signals simultaneously. In the third period t3, the signal of the first node Q1 and the signal of the third node Q3 each are low-level signals, and the signal of the second node Q2 is a high-level signal. The signals at the output terminal VOUT of the output circuit 20 and the scanning terminal GOUT of the scanning circuit 40 may change to low-level signals simultaneously.

The voltage of the first output signal of the output terminal VOUT and the voltage of the second output signal of the scanning terminal GOUT may be same, but the circuits connected to the output terminal VOUT and the scanning terminal GOUT are different. The output terminal VOUT is connected to the input terminal VIN of a next stage shift register unit 03, and is configured to drive the next stage shift register unit 03 to realize the stage transmission of the input signal. The scanning terminal GOUT is connected to the pixel circuits PX in the display area AA, and is configured to drive the pixel circuits PX to realize pixel scanning and refreshing. By separately arranging the scanning terminal GOUT for driving the pixel circuit PX and the output terminal for driving the next-stage shift register unit 03, the influence of the fluctuation of the second output signal of the scanning terminal GOUT on the first output signal of the output terminal VOUT may be the reduced, and the influence of the fluctuation of the first output signal of the output terminal VOUT on the second output signal of the scanning terminal GOUT may be reduced. As such, the stability and reliability of the circuit may be improved. In addition, the load of the scanning terminal GOUT may be different from the load of the output terminal VOUT. By setting different voltage terminals, the voltage terminals with different loads may be set separately, and signal accuracy may be improved.

In one embodiment, the first clock signal ck1 (*i*) of the first clock terminal VCK of the i-th stage shift register unit 03 (*i*) and the first clock signal ck1(*i*+1) of the first clock terminal VCK of the (i+1)-th stage shift register unit 03(*i*+1) may differ by half a cycle. That is, when the first clock signal ck1 (*i*) of the first clock terminal VCK of the i-th stage shift register unit 03 (*i*) is at a high level, the first clock signal ck1(*i*+1) of the first clock terminal VCK of the (i+1)-th stage shift register unit 03(*i*+1) is at a low level. On the contrary, when the first clock signal ck1 (*i*) of the first clock terminal VCK of the i-th stage shift register unit 03 (*i*) is at a low level, the first clock signal ck1(*i*+1) of the first clock terminal VCK of the (i+1)-th stage shift register unit 03(*i*+1) is at a high level.

In another embodiment, the first clock terminal VCK of the i-th shift register unit 03 (*i*) and the first clock terminal VCK of the (i+2)-th shift register unit 03(*i*+2) may be connected to a same clock signal line to receive a same clock signal (not shown in FIG. 15).

In an optional embodiment, in a same shift register unit 03, the second voltage terminal VG2 and the fourth voltage terminal VG4 are respectively connected to different signal lines (not shown in FIG. 15), and/or, the third voltage terminal VG3 and the fifth voltage terminal VG5 are respectively connected to different signal lines (not shown in FIG. 15).

In one embodiment, the scanning terminal GOUT of the scanning circuit 40 may be connected to a plurality of pixel circuits PX located in a same row, and the load of the scanning terminal GOUT may be relatively large. The output terminal VOUT of the output circuit 20 may be connected only to the shift register unit 03 of a next stage, and the load of the output terminal VOUT may be relatively small. By setting different voltage terminals to connect different signal lines, the load of the signal line connected to the voltage terminals (VG3, VG5) of the scanning circuit 40 may be relatively large, and the load of the signal line connected to the voltage terminal (VG2, VG4) of the output circuit 20 may be relatively small. As such, the signal delay on the signal line connected to the voltage terminal (VG2, VG4) of the output circuit 20 may be reduced, and the relatively large load of the scanning terminal GOUT affecting the change speed of the first output signal of the output terminal VOUT may be avoided. In addition, the charging rate of the signal line connected to the voltage terminal (VG3, VG5) of the scanning circuit 40 may be increased, and the signal delay of the second output signal of the scanning terminal GOUT may be reduced. There is no need to increase the charging rate of the signal line connected to the voltage terminal (VG2, VG4) of the output circuit 20, and the power consumption may be reduced.

It should be noted that the second voltage terminal VG2 and the fourth voltage terminal VG4 may be connected to different signal lines, but may receive signals of a same voltage. For example, the second voltage terminal VG2 and the fourth voltage terminal VG4 may each be a constant normal high-level signal VGH. The third voltage terminal VG3 and the fifth voltage terminal VG5 may be connected to different signal lines, but may receive signals of a same voltage. For example, the third voltage terminal VG3 and the fifth voltage terminal VG5 may each be a constant normal low-level signal VGL. In the present disclosure, the signals of the second voltage terminal VG2, the fourth voltage terminal VG4, the third voltage terminal VG3 and the fifth voltage terminal VG5 may be set according to actual needs.

In other optional embodiments, when the signals at the second voltage terminal VG2 and the fourth voltage terminal VG4 are same, in a same shift register unit 03, the second voltage terminal VG2 and the fourth voltage terminal VG4 may be connected to a same signal line (not shown in FIG. 15); and/or, when the signals at the third voltage terminal VG3 and the fifth voltage terminal VG5 are same, in a same shift register unit 03, the third voltage terminal VG3 and the fifth voltage terminal VG5 may be connected to a same signal line (not shown in FIG. 15) to reduce the number of signal lines.

In another optional embodiment, still referring to FIG. 15, the output circuit 20 includes a first output transistor M6 and a second output transistor M7. A gate of the first output transistor M6 is electrically connected to the third node Q3, and a gate of the second output transistor M7 is electrically connected to the second node Q2. A first electrode of the first output transistor M6 is electrically connected to the second voltage terminal VG2, and a first electrode of the second output transistor M7 is electrically connected to the third voltage terminal VG3. The second electrodes of the first output transistor M6 and the second output transistor M7 each are electrically connected to the output terminal VOUT. The scanning circuit 40 includes a third output transistor M6' and a fourth output transistor M7'. A gate of the third output transistor M6' is electrically connected to the third node Q3, and a gate of the fourth output transistor M7' is electrically connected to the second node Q2. A first electrode of the third output transistor M6' is electrically connected to the fourth voltage terminal VG4, and a first electrode of the fourth output transistor M7' is electrically connected to the fifth voltage terminal VG5. A second electrode of the third output transistor M6' and a second electrode of the fourth output transistor M7' each are electrically connected to the scanning terminal GOUT. The absolute value of the voltage of the fifth voltage terminal VG5 may be smaller than the absolute value of the voltage of the third voltage terminal VG3.

In one embodiment, the transistors in the output circuit 20 and the transistors in the scanning circuit 40 each are N-type transistors, and the enable levels of the output terminal VOUT and the scanning terminal GOUT each are high level. Still referring to FIGS. 15 and 16, the signal of the third voltage terminal VG3 may be a constant normal low-level signal VGL, and the signal of the fifth voltage terminal VG5 may be a constant weakened low-level signal HVGL. The voltage of the weakened low-level signal HVGL is greater than the voltage of the normal low-level signal VGL, and the voltage of the weakened low-level signal HVGL and the voltage of the normal low-level signal VGL may each be less than zero. When the signal of the second node Q2 is at a non-enable level, the signal of the second node Q2 may be a normal low-level signal VGL, and the gate-source voltage Vgs (M7') of the fourth output transistor M7' may be less than zero. As such, the fourth output transistor M7' may be fully turned off, and leakage current may be reduced. Accordingly, the stability of the second output signal of the scanning terminal GOUT may be maintained.

In some other optional embodiments, the transistors in the output circuit 20 and the transistors in the scanning circuit 40 may also be P-type transistors, and the enable levels of the output terminal VOUT and the scanning terminal GOUT may also be low levels (not shown in FIGS. 15 and 16). In this case, the signal of the third voltage terminal VG3 may be a constant normal high-level signal VGH, and the signal of the fifth voltage terminal VG5 may be a constant weakened high-level signal LVGH. The voltage of the weakened high-level signal LVGH may be lower than the voltage of the normal high-level signal VGH, and the voltages of the weakened high-level signal LVGH and the normal high-level signal VGH may each be greater than zero. When the signal of the second node Q2 is at a non-enable level, the signal of the second node Q2 may be a normal high-level signal VGH, and the gate-source voltage Vgs (M7') of the fourth output transistor M7' may be greater than zero. As such, the fourth output transistor M7' may be fully turned off, and leakage current may be reduced. Accordingly, the stability of the second output signal of the scanning terminal GOUT may be maintained.

In another optional embodiment, referring to FIG. 15, the output circuit 20 may also include a first coupling capacitor C2, where a first plate of the first coupling capacitor C2 is electrically connected to the second voltage terminal VG2, and a second plate of the first coupling capacitor C2 is electrically connected to the output terminal VOUT; and/or, the scanning circuit 40 may also include a third coupling capacitor C2', where a first plate of the third coupling capacitor C2' is electrically connected to the fourth voltage terminal VG4, and a second plate of the third coupling capacitor C2' is electrically connected to the scanning terminal GOUT. The output circuit 20 may also include a first storage capacitor C3, where a first plate of the first storage capacitor C3 is electrically connected to the second node Q2, and a second plate of the first storage capacitor C3 is electrically connected to the third voltage terminal VG3; and/or, the scanning circuit 40 may also include a second storage capacitor C3', where a first plate of the second storage capacitor C3' is electrically connected to the second node Q2, and a second plate of the second storage capacitor C3' is electrically connected to the fifth voltage terminal VG5.

Specifically, when the first output signal of the output terminal VOUT and the second output signal of the scanning terminal GOUT change, the first coupling capacitor C2 and/or the third coupling capacitor C2' may couple the signal of the third node Q3 high or low, such that the first output transistor M6 and the third output transistor M6' may be fully turned on. As such, the change of the first output signal and the second output signal may be sped up, and signal delay may be reduced. In addition, when the first output signal of the output terminal VOUT and the second output signal of the scanning terminal GOUT are maintained at a certain level for a long time, the first coupling capacitor C2 and/or the third coupling capacitor C2' may also maintain the level of the third node Q3. As such, the stability of the first output signal of the output terminal VOUT and the second output signal of the scanning terminal GOUT may be improved. When the first output signal of the output terminal VOUT and the second output signal of the scanning terminal GOUT are maintained at a certain level for a long time, the first storage capacitor C3 and/or the second storage capacitor C3' may maintain the level of the second node Q2. As such, the stability of the first output signal of the output terminal VOUT and the second output signal of the scanning terminal GOUT may be improved.

Figure 17:
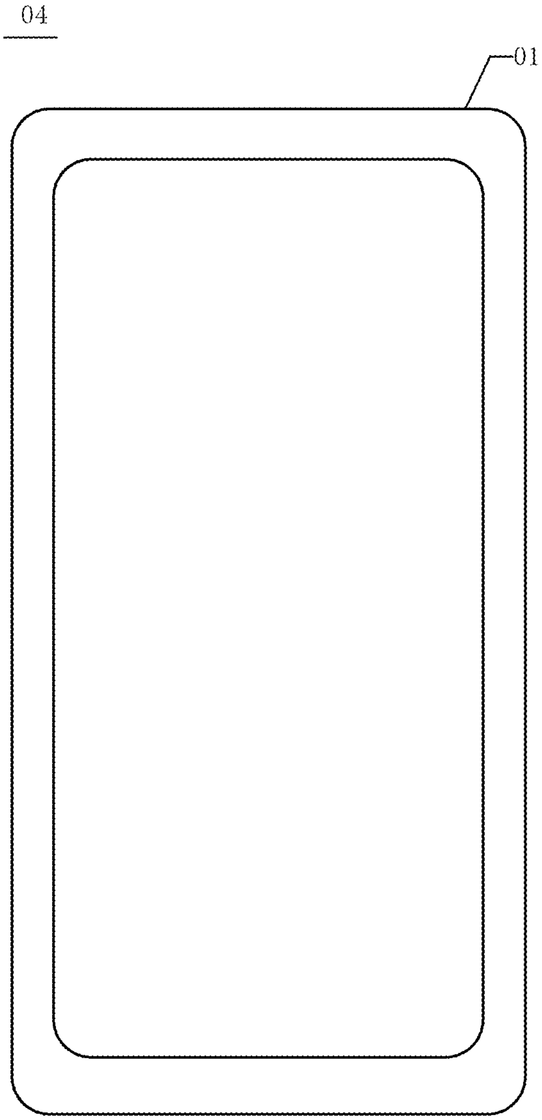
FIG. 17 illustrates a schematic structural diagram of a display device consistent with the disclosed embodiments of the present disclosure.

The present disclosure also provides a display device. FIG. 17 illustrates a schematic structural diagram of a display device consistent with the disclosed embodiments of the present disclosure. As shown in FIG. 17, the display device 04 includes a display panel 01 provided by the present disclosure. The display device 04 provided by the present disclosure may be a mobile phone as shown in FIG. 17, or may be any electronic product with a display function. The display device includes but is not limited to the following categories: televisions, laptops, desktop displays, tablet computers, digital cameras, smart bracelets, smart glasses, car displays, medical equipment, industrial control equipment, touch interactive terminals, etc. The present disclosure does not limit a specific category of display devices.

As disclosed, the technical solutions of the present disclosure have the following advantages.

The display panel provided by the present disclosure may include a shift register including a plurality of shift register units. The shift register may output a first output signal that shifts sequentially. The output circuit of each shift register unit may sequentially output a valid pulse of the first output signal when the third node in the shift register unit is at the enable level. As such, an orderly operation of the pixel circuit may be achieved, such that the display panel may display an image. In addition, a voltage stabilization circuit may be disposed between the first node and the third node of the shift register unit. When the third node is at an enable level, the voltage stabilization circuit may interrupt the transmission path between the first node and the third node during at least a part of the period, and cut off the first node and the third node. As such, the third node may be maintained at the enable level, and the third node may provide a stable enable level to the output circuit. Accordingly, the output circuit of the shift register unit may provide a stable enable level to the pixel circuit, the stable operation of the pixel circuit may be realized, and the display effect and reliability of the display panel may be improved. As a result, leakage from the third node to the first node and the input circuit may be avoided, and thus the enable level of the third node and the enable level of the output circuit may not be affected. As such, abnormal transistor state in the pixel circuit may be avoided, and the node level in the pixel circuit may not be affected. Accordingly, the light-emitting element in the pixel circuit may display accurately, and the display effect may be improved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A display panel, comprising a shift register, wherein:

the shift register includes a plurality of shift register units, wherein a shift register unit of the plurality of shift register units includes an input circuit, an output circuit and a voltage stabilization circuit;

the shift register unit further includes an input terminal, a first clock terminal, a first auxiliary voltage terminal, a first voltage terminal, a second voltage terminal, a third voltage terminal and an output terminal;

the input circuit is electrically connected to the input terminal, the first clock terminal, a first node and a second node respectively, and the input circuit is configured to control a signal of the first node and a signal of the second node according to an input signal of the input terminal and a first clock signal of the first clock terminal;

the voltage stabilization circuit includes a first voltage stabilization transistor and a first auxiliary transistor and is electrically connected to the first auxiliary voltage terminal, the first voltage terminal, the first node and a third node respectively, and the voltage stabilization circuit is configured to control a transmission path between the first node and the third node according to a signal of the first auxiliary voltage terminal, a signal of the first voltage terminal and a signal of the third node;

the output circuit is electrically connected to the second voltage terminal, the third voltage terminal, the third node, the second node, and the output terminal respectively, and the output circuit is configured to control the output terminal to output a first output signal according to the signal of the third node and the signal of the second node; and during at least a part of a period when the signal of the third node is at an enable level, the first node and the third node are cut off from each other by the voltage stabilization circuit in response to the signal of the third node being at the enable level controlling the first auxiliary transistor to be turned on.

2. The display panel according to claim 1, further comprising a plurality of pixel circuits, wherein:

a pixel circuit of the plurality of pixel circuits includes a driving transistor and a switching transistor; and the driving transistor and the switching transistor each are N-type transistors.

3. The display panel according to claim 2, wherein:

the shift register unit includes an input transistor, a voltage stabilization transistor and an output transistor; and the input transistor, the voltage stabilization transistor and the output transistor each are N-type transistors, and active layers of the driving transistor, the switching transistor, the input transistor, the voltage stabilization transistor and the output transistor each include a metal oxide material.

4. The display panel according to claim 1, wherein:

the shift register unit further includes a second auxiliary voltage terminal;

the input circuit includes a first input transistor, a second voltage stabilization transistor, and a second auxiliary transistor;

a first electrode of the first input transistor is electrically connected to the input terminal, a second electrode of the first input transistor and a first electrode of the second voltage stabilization transistor are electrically connected to a second auxiliary node, a second electrode of the second voltage stabilization transistor is electrically connected to the first node, a gate of the first input transistor and a gate of the second voltage stabilization transistor each are electrically connected to the first clock terminal; and a first electrode of the second auxiliary transistor is electrically connected to the second auxiliary voltage terminal, a second electrode of the second auxiliary transistor is electrically connected to the second auxiliary node, and a gate of the second auxiliary transistor is electrically connected to the first node.

5. The display panel according to claim 4, wherein:

a signal of the second auxiliary voltage terminal is a third constant voltage signal; and a voltage of the third constant voltage signal is equal to a voltage of the input terminal when the signal of the input terminal is at an enable level, and/or, the voltage of the third constant voltage signal is equal to a voltage of the second voltage terminal.

6. The display panel according to claim 4, wherein:

an area of an active region of an active layer of the second auxiliary transistor is smaller than an area of an active region of an active layer of the first input transistor.

7. The display panel according to claim 1, wherein:

the shift register unit further includes a scanning circuit, and the shift register unit further includes a fourth voltage terminal, a fifth voltage terminal and a scanning terminal;

the scanning circuit is electrically connected to the third node, the second node, the fourth voltage terminal, the fifth voltage terminal and the scanning terminal respectively, and the scanning circuit is configured to control a second output signal output by the scanning terminal according to the signal of the third node and the signal of the second node; and the output terminal of an i-th stage shift register unit of the plurality of shift register units is electrically connected to the input terminal of an (i+1)-th stage shift register unit of the plurality of shift register units, and the scanning terminal of the i-th stage shift register unit is electrically connected to a pixel circuit in the display panel, wherein i is a positive integer.

8. The display panel according to claim 7, wherein:

in a same shift register unit of the plurality of shift register units, the second voltage terminal and the fourth voltage terminal are respectively connected to different signal lines; and/or the third voltage terminal and the fifth voltage terminal are respectively connected to different signal lines.

9. The display panel according to claim 7, wherein:

the output circuit includes a first output transistor and a second output transistor; a gate of the first output transistor is electrically connected to the third node, and a gate of the second output transistor is electrically connected to the second node; a first electrode of the first output transistor is electrically connected to the second voltage terminal, and a first electrode of the second output transistor is electrically connected to the third voltage terminal; a second electrode of the first output transistor and a second electrode of the second output transistor each are electrically connected to the output terminal;

the scanning circuit includes a third output transistor and a fourth output transistor; a gate of the third output transistor is electrically connected to the third node, and a gate of the fourth output transistor is electrically connected to the second node; a first electrode of the third output transistor is electrically connected to the fourth voltage terminal, a first electrode of the fourth output transistor is electrically connected to the fifth voltage terminal, and a second electrode of the third output transistor and a second electrode of the fourth output transistor each are electrically connected to the scanning terminal; and an absolute voltage value of the fifth voltage terminal is smaller than an absolute voltage value of the third voltage terminal.

10. The display panel according to claim 9, wherein:

the output circuit further includes a first coupling capacitor, wherein a first plate of the first coupling capacitor is electrically connected to the second voltage terminal, and a second plate of the first coupling capacitor is electrically connected to the output terminal; and/or, the scanning circuit further includes a third coupling capacitor, wherein a first plate of the third coupling capacitor is electrically connected to the fourth voltage terminal, and a second plate of the third coupling capacitor is electrically connected to the scanning terminal; and the output circuit further includes a first storage capacitor, wherein a first plate of the first storage capacitor is electrically connected to the second node, and a second plate of the first storage capacitor is electrically connected to the third voltage terminal; and/or, the scanning circuit further includes a second storage capacitor, wherein a first plate of the second storage capacitor is electrically connected to the second node, and a second plate of the second storage capacitor is electrically connected to the fifth voltage terminal.

11. A display panel, comprising a shift register, wherein:

the shift register includes a plurality of shift register units, wherein a shift register unit of the plurality of shift register units includes an input circuit, an output circuit and a voltage stabilization circuit;

the shift register unit further includes an input terminal, a first clock terminal, a first auxiliary voltage terminal, a first voltage terminal, a second voltage terminal, a third voltage terminal and an output terminal;

the input circuit is electrically connected to the input terminal, the first clock terminal, a first node and a second node respectively, and the input circuit is configured to control a signal of the first node and a signal of the second node according to an input signal of the input terminal and a first clock signal of the first clock terminal;

the voltage stabilization circuit is electrically connected to the first auxiliary voltage terminal, the first voltage terminal, the first node and a third node respectively, and the voltage stabilization circuit is configured to control a transmission path between the first node and the third node according to a signal of the first auxiliary voltage terminal, a signal of the first voltage terminal and a signal of the third node;

the output circuit is electrically connected to the second voltage terminal, the third voltage terminal, the third node, the second node, and the output terminal respectively, and the output circuit is configured to control the output terminal to output a first output signal according to the signal of the third node and the signal of the second node;

the voltage stabilization circuit includes a first voltage stabilization transistor and a first auxiliary transistor;

a first electrode of the first voltage stabilization transistor is electrically connected to the first node, a second electrode of the first voltage stabilization transistor is electrically connected to the third node, and a gate of the first voltage stabilization transistor is electrically connected to the first voltage terminal;

a first electrode of the first auxiliary transistor is electrically connected to the first auxiliary voltage terminal, and a second electrode of the first auxiliary transistor and the first electrode of the first voltage stabilization transistor are electrically connected to a first auxiliary node, and a gate of the first auxiliary transistor is electrically connected to the third node; and during at least a part of a period when the signal of the third node is at an enable level, the first node and the third node are cut off from each other.

12. The display panel according to claim 11, wherein:

during at least a part of the period when the signal of the third node is at the enable level, an absolute voltage value of the third node is greater than an absolute voltage value of the first auxiliary voltage terminal.

13. The display panel according to claim 11, wherein:

the signal of the first auxiliary voltage terminal is a first constant voltage signal, and an absolute voltage value of the first constant voltage signal is greater than an absolute voltage value of the signal of the first voltage terminal when the signal of the first voltage terminal is at an enable level; or the signal of the first voltage terminal is a second constant voltage signal, and the second constant voltage signal is an enable signal of the first voltage stabilization transistor.

14. The display panel according to claim 11, wherein:

the voltage stabilization circuit further includes a protection transistor; and a first electrode of the protection transistor is electrically connected to the first node, a second electrode of the protection transistor is electrically connected to the first auxiliary node, and a gate of the protection transistor is electrically connected to the first voltage terminal.

15. The display panel according to claim 14, wherein:

the output circuit includes a first output transistor, a second output transistor and a first coupling capacitor;

a gate of the first output transistor is electrically connected to the third node, and a gate of the second output transistor is electrically connected to the second node; a first electrode of the first output transistor is electrically connected to the second voltage terminal, and a first electrode of the second output transistor is electrically connected to the third voltage terminal; a second electrode of the first output transistor and a second electrode of the second output transistor each are electrically connected to the output terminal;

a first plate of the first coupling capacitor is electrically connected to the third node, and a second plate of the first coupling capacitor is electrically connected to the output terminal; and during at least a part of the period when the signal of the third node is at the enable level, an absolute voltage value of the third node is greater than an absolute voltage value of the first node.

16. The display panel according to claim 14, wherein:

an area of an active region of an active layer of the first auxiliary transistor is smaller than an area of an active region of an active layer of the protection transistor.

17. The display panel according to claim 14, wherein:

the input circuit includes a first input transistor;

a first electrode of the first input transistor is electrically connected to the input terminal, a second electrode of the first input transistor is electrically connected to the first node, and a gate of the first input transistor is electrically connected to the first clock terminal; and a channel length of the protection transistor is greater than or equal to a channel length of the first input transistor.

18. The display panel according to claim 17, wherein:

the input circuit further includes a second input transistor, a third input transistor, a fourth input transistor, and a second coupling capacitor;

a gate of the third input transistor is electrically connected to the input terminal, a first electrode of the third input transistor is electrically connected to the third voltage terminal, a second electrode of the third input transistor and a gate of the second input transistor are electrically connected to a fourth node, a first electrode of the second input transistor is electrically connected to the first clock terminal, and a second electrode of the second input transistor is electrically connected to the second node;

a gate of the fourth input transistor is electrically connected to the first node, a first electrode of the fourth input transistor is electrically connected to the third voltage terminal, and a second electrode of the fourth input transistor is electrically connected to the second node;

a first plate of the second coupling capacitor is electrically connected to the first clock terminal, and a second plate of the second coupling capacitor is electrically connected to the fourth node; and the channel length of the first input transistor is greater than one or more of channel lengths of the second input transistor, the third input transistor, and the fourth input transistor.

19. The display panel according to claim 11, wherein:

the input circuit includes a first input transistor and a second voltage stabilization transistor;

a first electrode of the first input transistor is electrically connected to the input terminal, a second electrode of the first input transistor and a first electrode of the second voltage stabilization transistor are electrically connected to a second auxiliary node, a second electrode of the second voltage stabilization transistor is electrically connected to the first node, a gate of the first input transistor and a gate of the second voltage stabilization transistor each are electrically connected to the first clock terminal; and the second auxiliary node is electrically connected to the first auxiliary node.

20. A display device, including a display panel, wherein the display panel includes a shift register, wherein:

the shift register includes a plurality of shift register units, wherein a shift register unit of the plurality of shift register units includes an input circuit, an output circuit and a voltage stabilization circuit;

the shift register unit further includes an input terminal, a first clock terminal, a first auxiliary voltage terminal, a first voltage terminal, a second voltage terminal, a third voltage terminal and an output terminal;

the input circuit is electrically connected to the input terminal, the first clock terminal, a first node and a second node respectively, and the input circuit is configured to control a signal of the first node and a signal of the second node according to an input signal of the input terminal and a first clock signal of the first clock terminal;

the voltage stabilization circuit includes a first voltage stabilization transistor and a first auxiliary transistor and is electrically connected to the first auxiliary voltage terminal, the first voltage terminal, the first node and a third node respectively, and the voltage stabilization circuit is configured to control a transmission path between the first node and the third node according to a signal of the first auxiliary voltage terminal, a signal of the first voltage terminal and a signal of the third node;

the output circuit is electrically connected to the second voltage terminal, the third voltage terminal, the third node, the second node, and the output terminal respectively, and the output circuit is configured to control the output terminal to output a first output signal according to the signal of the third node and the signal of the second node; and during at least a part of a period when the signal of the third node is at an enable level, the first node and the third node are cut off from each other by the voltage stabilization circuit in response to the signal of the third node being at the enable level controlling the first auxiliary transistor to be turned on.

* * * * *